US011225620B2

(12) United States Patent
Obiols

(10) Patent No.: US 11,225,620 B2
(45) Date of Patent: *Jan. 18, 2022

(54) ADDITIVE COMPOSITION FOR FUEL

(71) Applicant: TOTAL MARKETING SERVICES, Puteaux (FR)

(72) Inventor: Jérôme Obiols, Feyzin (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/770,862

(22) PCT Filed: Dec. 4, 2018

(86) PCT No.: PCT/FR2018/053095
§ 371 (c)(1),
(2) Date: Jun. 8, 2020

(87) PCT Pub. No.: WO2019/110911
PCT Pub. Date: Jun. 13, 2019

(65) Prior Publication Data
US 2020/0392422 A1  Dec. 17, 2020

(30) Foreign Application Priority Data

Dec. 6, 2017 (FR) ..................... 1761694

(51) Int. Cl.
| | | |
|---|---|---|
| *C10L 1/236* | (2006.01) | |
| *C08F 293/00* | (2006.01) | |
| *C10L 1/2383* | (2006.01) | |
| *C10L 10/02* | (2006.01) | |
| *C10L 10/04* | (2006.01) | |
| *C10L 10/18* | (2006.01) | |

(52) U.S. Cl.
CPC ........ *C10L 1/2366* (2013.01); *C08F 293/005* (2013.01); *C10L 1/2383* (2013.01); *C10L 10/02* (2013.01); *C10L 10/04* (2013.01); *C10L 10/18* (2013.01); *C08F 2438/03* (2013.01); *C10L 2200/0423* (2013.01); *C10L 2230/22* (2013.01); *C10L 2250/04* (2013.01); *C10L 2270/023* (2013.01)

(58) Field of Classification Search
CPC ...... C10L 1/2366; C10L 1/2383; C10L 10/02; C10L 10/04; C10L 10/18; C10L 2200/0423; C10L 2230/22; C10L 2250/04; C10L 2270/023; C10L 1/234; C10L 2200/0446; C10L 2270/02; C08F 293/005; C08F 2438/03
See application file for complete search history.

(56) References Cited

U.S. PATENT DOCUMENTS

| | | |
|---|---|---|
| 2005/0171294 A1 | 8/2005 | Rath et al. |
| 2010/0319244 A1 | 12/2010 | Fehr et al. |
| 2018/0265793 A1 | 9/2018 | Prevost |

FOREIGN PATENT DOCUMENTS

| | | | |
|---|---|---|---|
| EP | 0 950 704 A1 | 10/1999 | |
| WO | 2011/134923 A1 | 11/2011 | |
| WO | WO-2011134923 A1 * | 11/2011 | ............ C08F 8/44 |

OTHER PUBLICATIONS

Apr. 2, 2019 International Search Report issued in International Patent Application No. PCT/FR2018/053095.
Apr. 2, 2019 Written Opinion of the International Searching Authority issued in International Patent Application No. PCT/FR2018/053095.

* cited by examiner

*Primary Examiner* — Taiwo Oladapo
(74) *Attorney, Agent, or Firm* — Oliff PLC

(57) ABSTRACT

A fuel additive composition, including: (a) one or more copolymer(s) including: at least one unit of the following formula (I), where u=0 or 1, E=—O— or —N(Z)—, or —O—CO—, or —CO—O— or —NH—CO— or —CO—NH—, where Z represents H or a C1-C6 alkyl group, G represents a group selected between a C1-C34 alkyl group, aromatic ring, aralkyl including at least one aromatic ring and at least one C1-C34 alkyl group, and at least one unit of the following formula (II), where R1" is selected between a hydrogen atom and a methyl group, Q is selected between an oxygen atom and a group —NR'—, where R' is selected between a hydrogen atom and C1-C12 hydrocarbon chains, R includes a C1-C34 hydrocarbon chain substituted with at least one quaternary ammonium, (b) one or more amines substituted with a polyalkenyl group, and (c) at least one carrier oil.

19 Claims, No Drawings

ADDITIVE COMPOSITION FOR FUEL

RELATED APPLICATION

This application is a national stage entry of PCT/FR2018/053095, filed Dec. 4, 2018, which is a continuation of French Patent Application No. 1761694, filed Dec. 6, 2017, which are incorporated by reference in their entirety.

The present invention relates to a liquid fuel additive composition for a spark ignition engine or a gasoline compression ignition (GCI) engine.

PRIOR ART

Liquid fuels for spark ignition engines or GCI engines contain components that can degrade during the running of the engine. The problem of deposits in the internal parts of spark ignition engines or GCI engines is well known to motorists. It has been shown that the formation of these deposits has consequences on the performance of the engine and notably has a negative impact on consumption and particle emissions. Progress in the technology of fuel additives has made it possible to confront this problem. "Detergent" additives used in fuels have already been proposed to keep the engine clean by limiting deposits ("keep-clean" effect) or by reducing the deposits already present in the internal parts of the spark ignition engine or GCI engine ("clean-up" effect). Mention may be made, for example, of U.S. Pat. No. 4,171,959 which describes a detergent additive for gasoline fuel containing a quaternary ammonium function. WO 2006/135881 describes a detergent additive containing a quaternary ammonium salt used for reducing or cleaning deposits, notably on the inlet valves. However, engine technology is in constant evolution and the stipulations for fuels must evolve to keep pace with these technological advances of spark ignition engines or GCI engines. In particular, the novel gasoline direct-injection systems expose the injectors to more severe pressure and temperature conditions, which promotes the formation of deposits. In addition, these novel injection systems have more complex geometries to optimize the spraying, notably more numerous holes having smaller diameters, but which, on the other hand, induce greater sensitivity to deposits. The presence of deposits may impair the combustion performance and notably increase pollutant emissions and particle emissions. Other consequences of the excessive presence of deposits have been reported in the literature, such as the increase in fuel consumption and driveability problems.

Since gasoline compression ignition (GCI) engines have the same architecture as conventional spark ignition engines, they are subject to the same problems of fouling.

Just like conventional spark ignition engines, GCI engines may be direct-injection or indirect-injection engines. The deposits found in conventional spark ignition engines may thus also be found in GCI engines.

Several types of deposits that are well known to motorists exist. In particular, mention may be made of deposits formed at high temperature on the fuel injectors of direct-injection spark ignition engines or GCI engines and on the intake valves of indirect-injection spark-injection engines and GCI engines during the use of virgin fuel (i.e. fuel that is not additive-enhanced). The formation of deposits of this type is well known to those skilled in the art and arises mainly when the engine is running in the "normal" regime. This "normal" running regime is characterized by a temperature of the engine coolant liquid of greater than or equal to 90° C.

In order to prevent the formation of this type of deposit at high temperature, it is known practice to motorists to introduce detergent additives into the fuel. However, the use of additive-enhanced fuels, notably enhanced with detergent additives, may in certain cases lead to the formation of deposits on the surface of the shafts of the intake valves of indirect-ignition spark ignition engines or GCI engines, in particular at low temperature. The formation of this type of deposit, in contrast with those defined above, arises when the engine has not been running for long enough to reach its "normal" running regime. This running regime is mainly encountered in engines used over short journeys, and more particularly during cold weather. It is characterized by a temperature of the coolant liquid of less than or equal to 80° C., preferably less than or equal to 60° C., or even less than or equal to 30° C. The accumulation of these deposits then leads to adhesion of said shafts to the valve guide and prevents the closure of the intake valves. This phenomenon of valve sticking is thus the cause of sealing problems in the combustion chamber, responsible for a reduction in the compression force and thus in the engine efficiency.

In some extreme cases, the intake valve, which has remained open due to the accumulation of deposits, can collide with the piston. This collision can then lead to deformation of the valve and/or of the valve shaft and thus to the breakdown of the engine. S. Mlkkonen et al, SAE Technical Paper Series, SAE 881643, 1988 studied this phenomenon in detail and concluded that the use of polymeric additives in fuels appears to promote this phenomenon of valve sticking.

In order to prevent the formation of deposits of this type, it is known practice to use the detergent additives of the prior art in combination with a carrier oil.

This carrier oil, which is characterized by a high boiling point, a high viscosity and noteworthy heat stability, makes it possible firstly to dissolve the additives, and notably the detergent additives, and secondly to form a fine thickness of carrier oil on the surface of the hot parts of the engine. This fine thickness of carrier oil in which the detergent additives are dissolved then makes it possible to efficiently clean the surface of the hot parts of the engine and to prevent the formation of deposits on these same surfaces. This fine layer of carrier oil comprising the detergent additives thus makes it possible to prevent the valve sticking that may arise in indirect-ignition spark ignition engines or GCI engines.

However, carrier oils are very expensive and thus represent a substantial part of the cost of the additives used in spark ignition engine or GCI engine fuels.

Moreover, the addition of a carrier oil cannot prevent valve sticking with all types of detergents. In particular, the use of a carrier oil cannot prevent the valve sticking that may arise in the presence of a detergent additive chosen from amine compounds substituted with a polyalkenyl chain.

WO 2011/134 923 discloses the use, as detergent additive in a direct-injection diesel engine, of a quaternized terpolymer obtained from ethylene (A), from monomers of alkyl or alkenyl ester type (B) and from ethylenically unsaturated monomers comprising at least one tertiary nitrogen atom that is at least partially quaternized.

Preventing and reducing deposits in these novel engines are essential for optimum running of modern engines. There is thus a need to propose fuel additive compositions which promote optimum running of spark ignition engines or GCI engines, notably for novel engine technologies.

There is also a need for a universal additive composition that is capable of acting on deposits irrespective of the type of engine, whether it be a spark ignition or a compression ignition (GCI) engine, and/or of the engine technology and/or of the composition of the fuel. The term "spark ignition engine or GCI engine technology" means a direct-injection gasoline (DIG) engine or an indirect-injection gasoline (IIG) engine.

There is more particularly a need for an additive composition based on polyalkenyl amine compounds and which is capable of acting on the deposits that are formed in spark ignition engines or in compression ignition engines both at high temperature and at low temperature.

In particular, there is still a need to provide a fuel additive composition which can be used both in spark ignition engines and in GCI engines, whether they be direct-injection or indirect-injection engines, making it possible simultaneously to prevent and/or limit the formation of deposits on the intake valves and on the injectors.

More particularly, there is still a need to provide a fuel additive composition, which can be used in indirect-injection spark ignition engines and/or GCI engines, which makes it possible to clean and to keep clean the hot parts of the engines and makes it possible to prevent valve sticking, with a reduced content of carrier oil.

SUBJECT OF THE INVENTION

The subject of the invention relates to novel fuel additive compositions.

The Applicant has discovered that the additive compositions according to the invention have noteworthy properties as detergent additive in liquid fuels for spark ignition engines or GCI engines. The copolymers according to the invention used in these fuels make it possible to keep the engine clean, in particular by limiting or preventing the formation of deposits ("keep-clean" effect) or by reducing the deposits already present in the internal parts of the spark ignition engine or GCI engine ("clean-up" effect).

In particular, the Applicant has discovered that the use of the additive compositions according to the invention in a spark ignition engine or in a GCI engine makes it possible to limit the formation of deposits on the injectors of direct-injection gasoline (DIG) engines and on the intake valves of indirect-injection gasoline (IIG) engines, while at the same time making it possible to prevent valve sticking in indirect-injection gasoline (IIG) engines.

The advantages associated with the use of such additive compositions according to the invention are:
optimum running of the engine,
reduction of the fuel consumption,
better driveability of the vehicle,
reduced pollutant emissions, and
savings due to less engine maintenance.

The invention relates to a fuel additive composition comprising:
(a) one or more copolymers comprising:
at least one unit of formula (I) below:

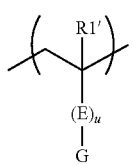

with
u=0 or 1,
$R_1'$ represents a hydrogen atom or a methyl group,
E=—O— or —N(Z)—, or —O—CO—, or —CO—O— or —NH—CO— or —CO—NH—, with Z representing H or a $C_1$-$C_6$ alkyl group,
G represents a group chosen from a $C_1$-$C_{34}$ alkyl, an aromatic nucleus, an aralkyl comprising at least one aromatic nucleus and at least one $C_1$-$C_{34}$ alkyl group, and
at least one unit of formula (II) below:

in which
$R_1''$ is chosen from a hydrogen atom and a methyl group,
Q is chosen from an oxygen atom and a group —NR'— with R' being chosen from a hydrogen atom and $C_1$ to $C_{12}$ hydrocarbon-based chains,
R comprises a $C_1$ to $C_{34}$ hydrocarbon-based chain substituted with at least one quaternary ammonium group and optionally one or more hydroxyl groups, the group R also possibly containing one or more nitrogen and/or oxygen atoms and/or carbonyl groups, and
(b) one or more amines substituted with a polyalkenyl group.

Preferentially, the additive composition according to the invention comprises:
(a) one or more copolymers comprising:
at least one unit of formula (I) below:

with
u=0 or 1,
$R_1'$ represents a hydrogen atom or a methyl group,
E=—O— or —N(Z)—, or —O—CO—, or —CO—O— or —NH—CO— or —CO—NH—, with Z representing H or a $C_1$-$C_6$ alkyl group,
G represents a group chosen from a $C_1$-$C_{34}$ alkyl, an aromatic nucleus, an aralkyl comprising at least one aromatic nucleus and at least one $C_1$-$C_{34}$ alkyl group, and
at least one unit of formula (II) below:

in which
R₁" is chosen from a hydrogen atom and a methyl group,
Q is chosen from an oxygen atom and a group —NR'— with R' being chosen from a hydrogen atom and $C_1$ to $C_{12}$ hydrocarbon-based chains,
R comprises a $C_1$ to $C_{34}$ hydrocarbon-based chain substituted with at least one quaternary ammonium group and optionally one or more hydroxyl groups, the group R also possibly containing one or more nitrogen and/or oxygen atoms and/or carbonyl groups,
(b) one or more amines substituted with a polyalkenyl group, and
(c) at least one carrier oil.

Preferably, the units of formula (I) and the units of formula (II) defined above represent at least 70 mol % of the copolymer (a), relative to the number of moles of units included in the composition of the copolymer (a), preferably at least 80 mol %, more preferentially at least 90 mol %, even more preferentially at least 95 mol % and advantageously at least 98 mol %.

Preferentially, the group G of formula (I) is chosen from a $C_4$-$C_{34}$ alkyl, an aromatic nucleus, an aralkyl comprising at least one aromatic nucleus and at least one $C_1$-$C_{34}$ and preferably $C_4$-$C_{34}$ alkyl group.

According to a first variant, the group G of formula (I) is a $C_4$-$C_{34}$ alkyl.

According to a second variant, the group G of formula (I) is an aralkyl comprising at least one aromatic nucleus and at least one $C_4$-$C_{30}$ alkyl group.

According to a first embodiment, the group E of formula (I) is chosen from: —O— and —N(Z)—, with Z representing H or a $C_1$-$C_6$ alkyl group.

According to a second embodiment, the group E of formula (I) is chosen from: —O—CO— and —NH—CO—; preferably, the group E is an —O—CO— group, it being understood that the group E=—O—CO— is connected to the vinyl carbon via the oxygen atom and that the group E=—NH—CO— is connected to the vinyl carbon via the nitrogen atom. According to a third embodiment, the group E of formula (I) is chosen from: —CO—O— and —CO—NH—; preferably, the group E is a —CO—O— group, it being understood that the group E is connected to the vinyl carbon via the carbon atom.

Advantageously, in formula (II), the quaternary ammonium group is chosen from pyrrolinium, pyridinium, imidazolium, triazolium, triazinium, oxazolium and isoxazolium quaternary ammoniums.

According to one variant, said quaternary ammonium group of formula (II) is chosen from trialkylammonium, iminium, amidinium, formamidinium, guanidinium and biguanidinium quaternary ammoniums, preferably trialkylammonium quaternary ammoniums.

According to a preferred embodiment, the group R of formula (II) is represented by one of the formulae (III) and (IV) below:

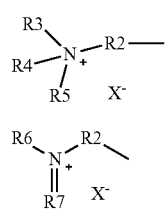

(III)

(IV)

in which:
X⁻ is chosen from hydroxide and halide ions and organic anions, preferably organic anions,
$R_2$ is chosen from $C_1$ to $C_{34}$ hydrocarbon-based chains, optionally substituted with at least one hydroxyl group, it being understood that the group $R_2$ is connected to Q in formula (II),
$R_3$, $R_4$ and $R_5$ are identical or different and chosen independently from $C_1$ to $C_{18}$ hydrocarbon-based chains, it being understood that the alkyl groups $R_3$, $R_4$ and $R_5$ may contain one or more groups chosen from: a nitrogen atom, an oxygen atom and a carbonyl group and that the groups $R_3$, $R_4$ and $R_5$ may be connected together in pairs to form one or more rings,
$R_6$ and $R_7$ are identical or different and chosen independently from $C_1$ to $C_{18}$ hydrocarbon-based chains, it being understood that the groups $R_6$ and $R_7$ may contain one or more groups chosen from: a nitrogen atom, an oxygen atom and a carbonyl group and that the groups $R_6$ and $R_7$ may be connected together to form a ring.

According to a first variant of this preferred embodiment, the group R of the unit of formula (II) is represented by formula (III), in which:
X⁻ is chosen from organic anions, preferably conjugate bases of carboxylic acids,
$R_2$ is chosen from $C_1$ to $C_{34}$ hydrocarbon-based chains, preferably $C_1$ to $C_{18}$ alkyl groups,
$R_3$, $R_4$ and $R_5$ are identical or different and chosen independently from $C_1$ to $C_{18}$ hydrocarbon-based chains, optionally substituted with at least one hydroxyl group, it being understood that at least one of the groups $R_3$, $R_4$ and $R_5$ contains at least one hydroxyl group.

According to a second variant of this preferred embodiment, the group $R_2$ is represented by one of the formulae (V) and (VI) below:

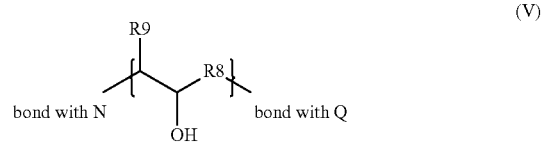

(V)

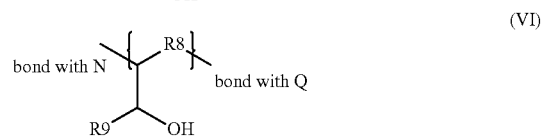

(VI)

in which:
$R_8$ is chosen from $C_1$ to $C_{32}$ hydrocarbon-based chains,
$R_9$ is chosen from hydrogen and $C_1$ to $C_6$ alkyl groups.

According to a particular embodiment, the copolymer (a) is obtained by copolymerization of at least:
one monomer ($m_a$) corresponding to formula (VII) below:

(VII)

in which $R_1'$, u, E and G are as defined above, one monomer ($m_b$) corresponding to formula (VIII) below:

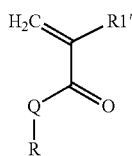

(VIII)

in which $R_1''$, Q and R are as defined above.

According to a preferred embodiment, the monomer ($m_a$) is chosen from $C_1$ to $C_{34}$ alkyl acrylates and $C_1$ to $C_{34}$ alkyl methacrylates.

According to a particular embodiment, the monomer ($m_b$) is obtained by reaction:

of a tertiary amine of formula $NR_3R_4R_5$ or $R_6N=R_7$ in which $R_3$, $R_4$, $R_5$, $R_6$ and $R_7$ are as defined above, and of a (meth)acrylate or (meth)acrylamide intermediate monomer ($m_1$) of formula (XV) below:

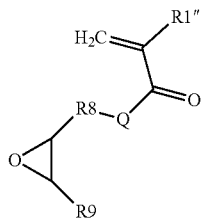

(XV)

in which:

Q, $R_1''$, $R_8$ and $R_9$ are as defined above.

According to a preferred embodiment, the copolymer (a) is chosen from block copolymers and random copolymers, and preferably the copolymer is a block copolymer.

Preferably, the copolymer is a block copolymer comprising:

a block A corresponding to formula (XI) below:

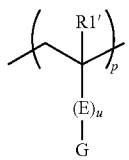

(XI)

in which p is an integer ranging from 2 to 100, preferably ranging from 5 to 80, preferably ranging from 10 to 70, more preferentially ranging from 20 to 60, $R_1'$, u, E and G are as defined above, a block B corresponding to formula (XII) below:

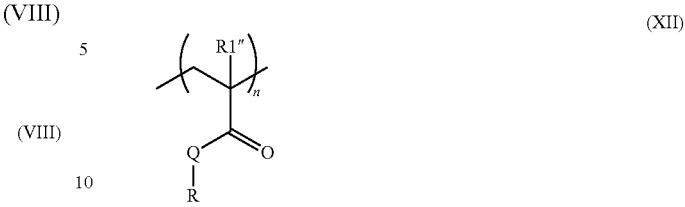

(XII)

in which n is an integer ranging from 2 to 50, preferably from 3 to 40, more preferentially from 4 to 20, even more preferentially from 5 to 10, $R_1''$, Q and R are as defined above.

Preferably, the block copolymer comprises at least:

one block A consisting of a chain of structural units derived from one or more monomers chosen from the monomers ($m_a$) of formula (VII), and one block B consisting of a chain of structural units derived from one or more monomers chosen from the monomers ($m_b$) of formula (VIII).

More preferentially, the block copolymer comprises at least:

block A consisting of a chain of structural units derived from a single monomer chosen from the monomers ($m_a$) of formula (VII), and block B consisting of a chain of structural units derived from a single monomer chosen from the monomers ($m_b$) of formula (VIII).

Even more preferentially, the block copolymer comprises at least:

block A consisting of a chain of structural units derived from a $C_1$-$C_{34}$ alkyl (meth)acrylate monomer ($m_a$), and block B consisting of a chain of structural units derived from an alkyl (meth)acrylate or alkyl(meth)acrylamide monomer ($m_b$), the alkyl radical of which consists of a $C_1$ to $C_{34}$ hydrocarbon-based chain substituted with at least one quaternary ammonium group and optionally one or more hydroxyl groups.

Preferably, the number of equivalents of monomer ($m_a$) of block A is from 2 to 100 mol.

Preferably, the number of equivalents of monomer ($m_b$) of block B is from 2 to 50 mol.

Preferably, the copolymer (a) comprises at least one sequence of blocks AB, ABA or BAB in which said blocks A and B form a sequence without the presence of an intermediate block of different chemical nature.

Preferentially, the block copolymer is obtained by block polymerization, preferably followed by one or more post-functionalizations.

According to a particular embodiment, block B is obtained by post-functionalization of an intermediate polymer Pi resulting from the polymerization of an intermediate (meth)acrylate or (meth)acrylamide monomer ($m_i$) of formula (XV) defined above, and in which said post-functionalization corresponds to the reaction of said intermediate polymer Pi with a tertiary amine $NR_3R_4R_5$ or $R_6N=R_7$, in which $R_3$, $R_4$, $R_5$, $R_6$ and $R_7$ are as defined above.

Advantageously, the intermediate polymer Pi also comprises at least one block A as defined previously.

Preferentially, the amine(s) substituted with a polyalkenyl group (b) are chosen from polyisobutene amines.

Preferably, the mass ratio between the copolymer(s) (a) as defined above and the amine(s) substituted with a polyalkenyl group (b) ranges from 5:95 to 95:5, preferably from 10:90 to 90:10.

According to one embodiment, in the additive composition according to the invention, the ratio between the mass of carrier oil (c) and the sum of the masses of copolymers (a) and of amines substituted with a polyalkenyl group (b) described above and in detailed manner below ranges from 0.1 to 2, preferably from 0.3 to 1.2 and more preferentially from 0.4 to 0.8.

The invention also relates to a concentrate for fuel comprising a fuel additive composition as defined above and in detailed manner below, mixed with an organic liquid. As is customary in the field, said organic liquid is inert with respect to the copolymer(s) (a), the amine(s) substituted with a polyalkenyl group (b) and the carrier oil(s) (c) that may be present, and is miscible with said fuel.

The invention also relates to a fuel composition comprising:
(1) a fuel derived from one or more sources chosen from the group consisting of mineral, animal, plant and synthetic sources, and
(2) an additive composition as described above and in detailed manner below.

Preferably, the fuel composition according to the invention comprises at least 5 ppm of copolymer(s) (a).

Preferably, the amine(s) substituted with a polyalkenyl group (b) are present in the fuel composition according to the invention in an amount ranging from 1 to 1000 ppm, preferably ranging from 5 to 500 ppm, more preferentially ranging from 50 to 500 ppm and even more preferentially ranging from 100 to 300 ppm.

Preferentially, the copolymer(s) (a) are present in the fuel composition according to the invention in an amount ranging from 1 to 1000 ppm, preferably ranging from 5 to 500 ppm, more preferentially ranging from 10 to 200 ppm and even more preferentially ranging from 20 to 100 ppm.

Preferably, the fuel (1) is chosen from hydrocarbon-based fuels, fuels that are not essentially hydrocarbon-based, and mixtures thereof.

Advantageously, the hydrocarbon-based fuel is chosen from gasolines.

The invention also relates to the use of a fuel additive composition as described above and in detailed manner below, as detergent additive in a liquid fuel for spark ignition engines or in a gasoline compression ignition engine, said fuel additive composition being used alone or in the form of a concentrate as defined above and in detailed manner below.

According to a particular embodiment, the fuel additive composition is used in the liquid fuel for keeping clean and/or cleaning at least one of the internal parts of said spark ignition engine or of said gasoline compression ignition engine.

According to a particular embodiment, the fuel additive composition is used in the liquid fuel for limiting or preventing the formation of deposits in at least one of the internal parts of said spark ignition engine or of said gasoline compression ignition engine and/or for reducing the existing deposits in at least one of the internal parts of said spark ignition engine or of said gasoline compression ignition engine.

According to a particular embodiment, the fuel additive composition is used in the liquid fuel for reducing the fuel consumption of the spark ignition engine or of the gasoline compression ignition engine.

According to a particular embodiment, the fuel additive composition is used in the liquid fuel for reducing the pollutant emissions, in particular the particle emissions of the spark ignition engine or of the gasoline compression ignition engine.

Advantageously, the deposits are located in at least one of the internal parts chosen from the engine intake system, the combustion chamber and the fuel injection system. Preferentially, the additive composition is used for preventing and/or reducing the formation of deposits associated with coking and/or deposits of soap and/or lacquering type.

According to a first embodiment, the fuel additive composition according to the invention is used in a direct-injection spark ignition engine or gasoline compression ignition engine, for maintaining the cleanliness of and/or for cleaning the engine injectors.

According to a second embodiment, the fuel additive composition according to the invention is used in an indirect-injection spark ignition engine or gasoline compression ignition engine, for maintaining the cleanliness of and/or for cleaning the engine intake valves.

According to one embodiment, the fuel additive composition according to the invention is used for preventing and/or impeding and/or limiting and/or delaying the sticking of the intake valves in an indirect-injection spark ignition engine or gasoline compression ignition engine.

According to a first embodiment, the engine is a spark ignition engine.

According to a second embodiment, the engine is a gasoline compression ignition engine (GCI engine).

Finally, the invention relates to a process for keeping clean and/or for cleaning at least one of the internal parts of a spark ignition engine or gasoline compression ignition engine, comprising at least the following steps:

the preparation of a fuel composition by additive enhancement of a fuel with an additive composition or a concentrate as described above and in detailed manner below, and the introduction, and notably the combustion, of said fuel composition in said spark ignition engine or in said gasoline compression ignition engine.

DETAILED DESCRIPTION

Other advantages and features will emerge more clearly from the description that follows. The particular embodiments of the invention are given as nonlimiting examples.

For the sake of simplicity, the following terms will be used in the rest of the description:

"alkyl (meth)acrylate" to denote an alkyl acrylate or an alkyl methacrylate;

"alkyl(meth)acrylamide" to denote an alkylacrylamide or an alkylmethacrylamide; and "quaternary ammonium" to denote a quaternary ammonium salt.

For the purposes of the invention, the term "unit" means a group of atoms constituting a part of the structure of the copolymer and corresponding to a monomer employed in the synthesis of the copolymer.

The invention relates to a fuel additive composition comprising:
(a) one or more copolymers comprising:
at least one unit of formula (I) below:

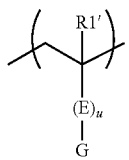

with
u=0 or 1,
R$_1$' represents a hydrogen atom or a methyl group; preferably, R$_1$' is a hydrogen atom,
E=—O— or —N(Z)—, or —O—CO—, or —CO—O— or —NH—CO— or —CO—NH—, with Z representing H or a C$_1$-C$_6$ alkyl group,
G represents a group chosen from a C$_1$-C$_{34}$ alkyl, an aromatic nucleus, an aralkyl comprising at least one aromatic nucleus and at least one C$_1$-C$_{34}$ alkyl group, and
at least one unit of formula (II) below:

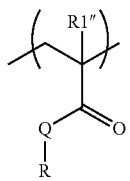

in which
R$_1$" is chosen from a hydrogen atom and a methyl group,
Q is chosen from an oxygen atom and a group —NR'— with R' being chosen from
a hydrogen atom and C$_1$ to C$_{12}$ hydrocarbon-based chains,
R comprises a C$_1$ to C$_{34}$ hydrocarbon-based chain substituted with at least one quaternary ammonium group and optionally one or more hydroxyl groups, the group R also possibly containing one or more nitrogen and/or oxygen atoms and/or carbonyl groups,
(b) one or more amine(s) substituted with a polyalkenyl group.

The Copolymer (a)

According to a particular embodiment, the units of formula (I) and the units of formula (II) defined above represent at least 70 mol % of the copolymer (a), relative to the number of moles of units included in the composition of the copolymer (a), preferably at least 80 mol %, more preferentially at least 90 mol %, even more preferentially at least 95 mol % and advantageously at least 98 mol %.

According to a preferred embodiment, the copolymer (a) comprises only units of formula (I) and units of formula (II).

According to a particular embodiment, the copolymer (a) is chosen from block or random copolymers.

According to a particularly preferred embodiment, the copolymer (a) is a block copolymer.

According to a first variant, the unit of formula (I) is chosen from those complying with u=0.

Preferentially, and according to this first variant, the copolymer is a block copolymer. According to another variant, the unit of formula (I) is chosen from those complying with u=1.

The group E of formula (I) is chosen from:
E=—O—,
E=—N(Z)— with Z representing H or a linear or branched, cyclic or acyclic, preferably acyclic, C$_1$-C$_6$ alkyl group,
E=—O—CO—, it being understood that E is then connected to the vinyl carbon via the oxygen atom,
E=—CO—O—, it being understood that E is then connected to the vinyl carbon via the carbon atom,
E=—NH—CO—, and
E=—CO—NH—.

According to a first embodiment, the group E of formula (I) is chosen from: —O— and —N(Z)—, with Z representing H or a C$_1$-C$_6$ alkyl group.

According to a second embodiment, the group E of formula (I) is chosen from: —O—CO— and —NH—CO—, it being understood that the group E=—O—CO— is connected to the vinyl carbon via the oxygen atom and that the group E=—NH—CO— is connected to the vinyl carbon via the nitrogen atom.

According to this same embodiment, the group E of formula (I) is preferably the —O—CO— group, it being understood that the —O—CO— group is connected to the vinyl carbon via the oxygen atom.

According to a third embodiment, the group E of formula (I) is chosen from: —CO—O— and —CO—NH—, it being understood that the group E is connected to the vinyl carbon via the carbon atom.

According to this same third embodiment, the group E of formula (I) is preferably the —CO—O— group, it being understood that the —CO—O— group is connected to the vinyl carbon via the carbon atom.

According to a preferred embodiment, the unit of formula (I) is such that u=1 and the group E is a —CO—O— group, E being connected to the vinyl carbon via the carbon atom.

The group (G) of formula (I) may be a C$_1$-C$_{34}$ alkyl, preferably a C$_4$-C$_{34}$, preferably C$_4$-C$_{30}$, more preferentially C$_6$-C$_{24}$ and even more preferentially C$_8$ to C$_{18}$ alkyl radical. The alkyl radical is a linear or branched, cyclic or acyclic, preferably acyclic, radical.

This alkyl radical may comprise a linear or branched part and a cyclic part.

The group (G) of formula (I) is advantageously an acyclic C$_1$-C$_{34}$ alkyl, preferably a C$_4$-C$_{34}$, preferably C$_4$-C$_{30}$, more preferentially C$_6$-C$_{24}$ and even more preferentially C$_8$-C$_{18}$ alkyl radical, which is linear or branched, preferably branched.

Mention may be made, nonlimitingly, of alkyl groups such as butyl, octyl, decyl, dodecyl, 2-ethylhexyl, isooctyl, isodecyl and isododecyl.

The group (G) of formula (I) may also be an aromatic nucleus, preferably a phenyl or aryl group. Among the aromatic groups, mention may be made, nonlimitingly, of the phenyl or naphthyl group, preferably the phenyl group.

The group (G) of formula (I) may, according to another preferred variant, be an aralkyl comprising at least one aromatic nucleus and at least one C$_1$-C$_{34}$ alkyl group.

Preferably, according to this variant, the group (G) is an aralkyl comprising at least one aromatic nucleus and one or more C$_4$-C$_{34}$, preferably C$_4$-C$_{30}$, more preferentially C$_6$-C$_{24}$ and even more preferentially C$_8$-C$_{18}$ alkyl groups.

The aromatic nucleus may be monosubstituted or substituted on several of its carbon atoms. Preferably, the aromatic nucleus is monosubstituted.

The $C_1$-$C_{34}$ alkyl group may be in the ortho, meta or para position on the aromatic nucleus, preferably in the para position.

The alkyl radical is a linear or branched, cyclic or acyclic, preferably acyclic, radical. The alkyl radical is preferably a linear or branched, preferably branched, acyclic radical.

The aromatic nucleus may be directly connected to the group E or to the vinyl carbon but it may also be connected via an alkyl substituent.

Examples of groups G that may be mentioned include a benzyl group substituted in the para position with a $C_4$-$C_{34}$ and preferably $C_4$-$C_{30}$ alkyl group.

Preferably, according to this variant, the group (G) of formula (I) is an aralkyl comprising at least one aromatic nucleus and at least one $C_4$-$C_{34}$, preferably $C_4$-$C_{30}$, more preferentially $C_6$-$C_{24}$ and even more preferentially $C_8$-$C_{18}$ alkyl group.

According to a particular embodiment, the group Q of formula (II) is an oxygen atom. According to a particular embodiment, the group R of formula (II) comprises a quaternary ammonium group and one or more hydroxyl groups.

According to one variant, the group R is chosen from groups bearing at least one quaternary ammonium function obtained by quaternization of a primary, secondary or tertiary amine according to any known process.

The group R may be chosen in particular from groups bearing at least one quaternary ammonium function, obtained by quaternization of at least one amine, imine, amidine, guanidine, aminoguanidine or bisguanidine function; heterocyclic groups containing from 3 to 34 atoms and at least one nitrogen atom.

Advantageously, the group R is chosen from groups bearing at least one quaternary ammonium function obtained by quaternization of a tertiary amine.

According to a particular embodiment, the group R of formula (II) is represented by one of the formulae (III) and (IV) below:

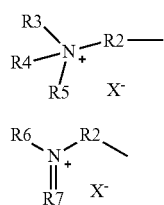

(III)

(IV)

in which:

$X^-$ is chosen from hydroxide and halide ions and organic anions, in particular the acetate ion, $R_2$ is chosen from cyclic or acyclic, linear or branched $C_1$ to $C_{34}$, preferably $C_1$ to $C_{18}$, more preferentially $C_1$ to $C_8$ and even more preferentially $C_2$ to $C_4$ hydrocarbon-based chains, optionally substituted with at least one hydroxyl group; preferably, $R_2$ is chosen from alkyl groups, optionally substituted with at least one hydroxyl group, it being understood that the group $R_2$ is connected to the group Q in formula (II), $R_3$, $R_4$ and $R_5$ are identical or different and chosen independently from linear or branched, cyclic or acyclic $C_1$ to $C_{18}$ and preferably $C_1$ to $C_{12}$ hydrocarbon-based chains, it being understood that the alkyl groups $R_3$, $R_4$ and $R_5$ may contain one or more nitrogen and/or oxygen atoms and/or carbonyl groups and may be connected together in pairs to form one or more rings, $R_6$ and $R_7$ are identical or different and chosen independently from linear or branched, cyclic or acyclic $C_1$ to $C_{18}$ and preferably $C_1$ to $C_{12}$ hydrocarbon-based chains, it being understood that the groups $R_6$ and $R_7$ may contain one or more nitrogen and/or oxygen atoms and/or carbonyl groups and may be connected together to form a ring.

The nitrogen and/or oxygen atom(s) may be present in the groups $R_3$, $R_4$ and $R_5$ in the form of ether bridges or amine bridges or in the form of an amine or hydroxyl substituent.

The organic anions of the group $X^-$ are advantageously conjugate bases of organic acids, preferably conjugate bases of carboxylic acids, in particular acids chosen from cyclic or acyclic monocarboxylic and polycarboxylic acids. Preferably, the organic anions of the group $X^-$ are chosen from conjugate bases of saturated acyclic or aromatic cyclic carboxylic acids. Examples that will be mentioned include methanoic acid, acetic acid, adipic acid, oxalic acid, malonic acid, succinic acid, citric acid, benzoic acid, phthalic acid, isophthalic acid and terephthalic acid.

According to a particular embodiment, the group $R_2$ is chosen from linear or branched $C_1$ to $C_{34}$, preferably $C_1$ to $C_{18}$, more preferentially $C_1$ to $C_8$ and even more preferentially $C_2$ to $C_4$ acyclic alkyl groups, substituted with at least one hydroxyl group.

According to a particular embodiment, the group R of formula (II) comprises a hydrocarbon-based chain substituted with at least one quaternary ammonium group and one or more hydroxyl groups.

Advantageously, the group R of formula (II) is represented by formula (III) in which:

$X^-$ is chosen from organic anions, preferably conjugate bases of carboxylic acids, $R_2$ is chosen from $C_1$ to $C_{34}$ hydrocarbon-based chains, preferably $C_1$ to $C_{18}$ alkyl groups, $R_3$, $R_4$ and $R_5$ are identical or different and chosen independently from $C_1$ to $C_{18}$ hydrocarbon-based chains, optionally substituted with at least one hydroxyl group, it being understood that at least one of the groups $R_3$, $R_4$ and $R_5$ contains at least one hydroxyl group.

According to a particular embodiment, the group $R_2$ is represented by one of the formulae (V) and (VI) below:

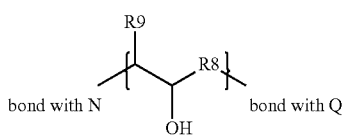

(V)

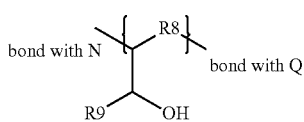

(VI)

in which:

$R_8$ is chosen from cyclic or acyclic, preferably acyclic, linear or branched $C_1$ to $C_{32}$ and preferably $C_1$ to $C_{16}$ hydrocarbon-based chains, preferably alkyl groups, $R_9$ is chosen from hydrogen and $C_1$ to $C_6$, $C_1$ to $C_4$ alkyl groups, more preferentially hydrogen.

According to a particular embodiment, the unit of formula (I) is obtained from a monomer ($m_a$).

Preferably, the monomer (ma) corresponds to formula (VII) below:

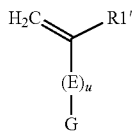

(VII)

with $R_1'$, E, G and u are as defined above; the preferred variants of $R_1'$, E, G and u according to formula (I) as defined above are also preferred variants of formula (VII).

Advantageously, the group $R_1'$ is a hydrogen atom.

When the group E of the monomer ($m_a$) is an —O—CO— group, it being understood that the —O—CO— group is connected to the vinyl carbon via the oxygen atom, the monomer ($m_a$) is preferably chosen from $C_1$ to $C_{34}$, preferably $C_4$ to $C_{30}$, more preferentially $C_6$ to $C_{24}$ and more preferentially $C_8$ to $C_{22}$ alkyl vinyl esters. The alkyl radical of the alkyl vinyl ester is linear or branched, cyclic or acyclic, preferably acyclic.

Among the vinyl alkyl ester monomers, examples that may be mentioned include vinyl octanoate, vinyl decanoate, vinyl dodecanoate, vinyl tetradecanoate, vinyl hexadecanoate, vinyl octadecanoate, vinyl docosanoate and vinyl 2-ethylhexanoate. When the group E of the monomer ($m_a$) is a —CO—O— group, it being understood that the —CO—O— group is connected to the vinyl carbon via the carbon atom, the monomer ($m_a$) is preferably chosen from $C_1$ to $C_{34}$, preferably $C_4$ to $C_{30}$, more preferentially $C_6$ to $C_{24}$ and more preferentially $C_8$ to $C_{22}$ alkyl acrylates or methacrylates. The alkyl radical of the acrylate or methacrylate is linear or branched, cyclic or acyclic, preferably acyclic.

Among the alkyl (meth)acrylates that may be used in the manufacture of the copolymer of the invention, mention may be made, in a nonlimiting manner, of: n-octyl acrylate, n-octyl methacrylate, n-decyl acrylate, n-decyl methacrylate, n-dodecyl acrylate, n-dodecyl methacrylate, 2-ethylhexyl acrylate, 2-ethylhexyl methacrylate, isooctyl acrylate, isooctyl methacrylate, isodecyl acrylate, isodecyl methacrylate. According to a particular embodiment, the unit of formula (II) is obtained from a monomer ($m_b$).

Preferably, the monomer ($m_b$) is chosen from those of formula (VIII):

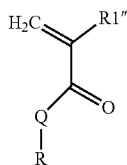

(VIII)

in which $R_1''$, Q and R are as defined above; the preferred variants of $R_1''$, Q and R according to formula (II) as defined above are also preferred variants of formula (VIII).

According to a particular embodiment, the monomer ($m_b$) is represented by one of the formulae (IX) and (X) below:

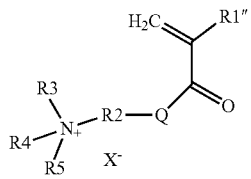

(IX)

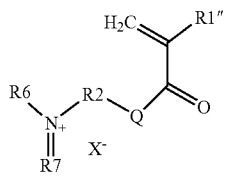

(X)

in which:

R1″ and Q are as defined above; the preferred variants of R1″ and Q according to formula (II) as defined above are also preferred variants of formulae (IX) and (X), $X^-$, $R_2$, $R_3$, $R_4$, $R_5$, $R_6$ and $R_7$ are as defined above; the preferred variants of $X^-$, $R_2$, $R_3$, $R_4$, $R_5$, $R_6$ and $R_7$ according to formulae (III) and (IV) as defined above are also preferred variants of formulae (IX) and (X).

According to a particular embodiment, the copolymer (a) may be obtained by copolymerization of at least one monomer ($m_a$) and of at least one monomer ($m_b$). According to a particular embodiment, at least 70 mol % of the monomers used for the preparation of the copolymer (a) are chosen from the monomers ($m_a$) and the monomers ($m_b$) defined above, preferably at least 80 mol %, more preferentially at least 90 mol %, even more preferentially at least 95 mol % and advantageously at least 98 mol %.

According to a particular preferred embodiment, the copolymer (a) is obtained only from monomers ($m_a$) and monomers ($m_b$).

The copolymer (a) may be prepared according to any known polymerization process. The various polymerization techniques and conditions are widely described in the literature and fall within the general knowledge of a person skilled in the art.

According to a particular embodiment, the copolymer (a) is a block copolymer comprising at least one block A and at least one block B.

Block A corresponds to formula (XI) below:

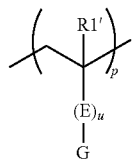

(XI)

in which p is an integer ranging from 2 to 100, preferably from 5 to 80, preferably from 10 to 70, more preferentially from 20 to 60, $R_1'$, E, G and u are as defined above; the preferred variants of $R_1'$, E, G and u according to formula (I) as defined above are also preferred variants of formula (XI).

Block B corresponds to formula (XII) below:

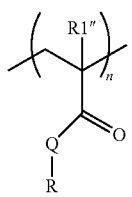

(XII)

in which n is an integer ranging from 2 to 50, preferably from 3 to 40, more preferentially from 4 to 20, even more preferentially from 5 to 10, $R_1''$, Q and R are as defined above; the preferred variants of $R_1''$, Q and R according to formula (II) as defined above are also preferred variants of formula (XII).

According to a particular embodiment, block B is represented by one of the formulae (XIII) and (XIV) below:

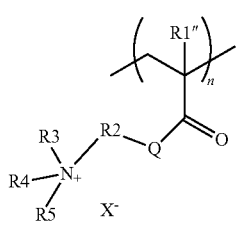

(XIII)

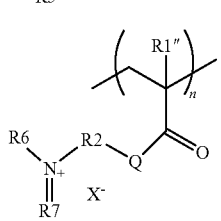

(XIV)

in which:

n, Q and $R_1''$ are as described above; the preferred variants of n, Q and $R_1''$ according to formulae (II) and (XII) as defined above are also preferred variants of formulae (XIII) and (XIV), $X^-$, $R_2$, $R_3$, $R_4$, $R_5$, $R_6$ and $R_7$ are as defined above; the preferred variants $X^-$, $R_2$, $R_3$, $R_4$, $R_5$, $R_6$ and $R_7$ according to formulae (III) and (IV) as defined above are also preferred variants of formulae (XIII) and (XIV).

According to a particular embodiment, block A consists of a chain of structural units derived from at least one monomer $(m_a)$ as described above.

According to a particular embodiment, block B consists of a chain of structural units derived from at least one monomer $(m_b)$ as described previously.

According to a particular embodiment, block A consists of a chain of structural units derived from an alkyl acrylate or alkyl methacrylate monomer $(m_a)$ and block B corresponds to formula (XII) described above.

According to a particular embodiment, the block copolymer is obtained by copolymerization of at least the alkyl (meth)acrylate monomer $(m_a)$ and of at least the monomer $(m_b)$.

It is understood that it would not constitute a departure from the invention if the copolymer (a) according to the invention were obtained from monomers other than $(m_a)$ and $(m_b)$, provided that the final copolymer corresponds to that of the invention, i.e. a copolymer comprising at least one unit of formula (I) and at least one unit of formula (II) as defined above. For example, it would not constitute a departure from the scope of the invention if the copolymer were obtained by copolymerization of monomers other than $(m_a)$ and $(m_b)$ followed by a post-functionalization.

For example, the units derived from a monomer $(m_a)$ may be obtained from vinyl alcohol or from acrylic acid, respectively, by transesterification or amidation reaction. For example, the units derived from a monomer $(m_b)$ may be obtained by post-functionalization of an intermediate polymer Pi resulting from the polymerization of an intermediate (meth)acrylate or (meth)acrylamide monomer $(m_1)$ of formula (XV) defined below, and in which said post-functionalization corresponds to the reaction of said intermediate polymer Pi with a tertiary amine $NR_3R_4R_5$ or $R_6N=R_7$, in which $R_3$, $R_4$, $R_5$, $R_6$ and $R_7$ are as defined above in formulae (III) and (IV).

The block copolymer may be obtained by block polymerization, preferably by controlled block polymerization, optionally followed by one or more post-functionalizations.

According to a particular embodiment, the block copolymer described above is obtained by controlled block polymerization. The polymerization is advantageously chosen from controlled radical polymerization; for example atom transfer radical polymerization (ATRP); nitroxide-mediated radical polymerization (NMP); degenerative transfer processes such as degenerative iodine transfer polymerization (ITRP: iodine transfer radical polymerization) or reversible addition-fragmentation chain-transfer radical polymerization (RAFT: reversible addition-fragmentation chain transfer); polymerizations derived from ATRP such as polymerizations using initiators for continuous activator regeneration (ICAR) or using activators regenerated by electron transfer (ARGET).

Mention will be made, by way of example, of the publication "Macromolecular engineering by atom transfer radical polymerization", JACS, 136, 6513-6533 (2014), which describes a controlled block polymerization process for forming block copolymers.

Mention may be made, for example, for NMP, of the identification by C. J. Hawker of an alkoxyamine that is capable of acting as a unimolecular agent, simultaneously providing the reactive initiator radical and the intermediate nitroxide radical in stable form (C. J. Hawker, *J. Am. Chem. Soc.*, 1994, 116, 11185). Hawker also developed a universal NMP initiator (D. Benoit et al., *J. Am. Chem. Soc.*, 1999, 121, 3904).

Reversible addition-fragmentation chain transfer (RAFT) radical polymerization is a living radical polymerization technique. The RAFT technique was discovered in 1988 par by the Australian scientific research organization CSIRO (J. Chiefari et al., *Macromolecules*, 1998, 31, 5559). The RAFT technique very rapidly became the subject of intensive research by the scientific community since it allows the synthesis of macromolecules having complex architectures, notably block, grafted or comb structures or else star-shaped structures, while at the same time making it possible to control the molecular mass of the macromolecules obtained (G. Moad et al., *Aust. J. Chem*, 2005, 58, 379). RAFT polymerization may be applied to a very wide range of vinyl monomers and under various experimental conditions, including its use for the preparation of water-soluble materials (C. L. McCormick et al., *Acc. Chem. Res.* 2004, 37, 312). The RAFT process includes the conventional radical polymerization of a substituted monomer in the presence of a suitable chain-transfer agent (CTA or RAFT agent). The RAFT agents commonly used comprise thiocarbonylthio compounds such as dithioesters (J. Chiefari et al., *Macromolecules*, 1998, 31, 5559), dithiocarbamates (R. T. A. Mayadunne et al., *Macromolecules*, 1999, 32, 6977; M. Destarac et al., *Macromol. Rapid. Commun.*, 2000, 21, 1035), trithiocarbonates (R. T. A. Mayadunne et al., *Macromolecules*, 2000, 33, 243) and xanthates (R. Francis et al., *Macromolecules*, 2000, 33, 4699), which perform the polymerization via a reversible chain-transfer process. The use of a suitable RAFT agent allows the synthesis of polymers having a high degree of functionality and having a narrow molecular weight distribution, i.e. a low polydispersity index (PDI).

Examples of descriptions of RAFT radical polymerizations that may be mentioned include the following documents: WO 1998/01478, WO 1999/31144, WO 2001/77198, WO 2005/00319, WO 2005/000924.

The controlled block polymerization is typically performed in a solvent, under an inert atmosphere, at a reaction temperature generally ranging from 0 to 200° C., preferably from 50° C. to 130° C. The solvent may be chosen from polar solvents, in particular ethers such as anisole (methoxybenzene) or tetrahydrofuran, or apolar solvents, in particular paraffins, cycloparaffins, aromatics and alkylaromatics containing from 1 to 19 carbon atoms, for example benzene, toluene, cyclohexane, methylcyclohexane, n-butene, n-hexane, n-heptane and the like.

For atom transfer radical polymerization (ATRP), the reaction is generally performed under vacuum in the presence of an initiator, a ligand and a catalyst. Examples of ligands that may be mentioned include N,N,N',N",N"-pentamethyldiethylenetriamine (PMDETA), 1,1,4,7,10,10-hexamethyltriethylenetetramine (HMTETA), 2,2'-bipyridine (BPY) and tris(2-pyridylmethyl)amine (TPMA). Examples of catalysts that may be mentioned include: CuX, $CuX_2$, with X=Cl, Br and complexes based on ruthenium $Ru^{2+}/Ru^{3+}$.

The ATRP polymerization is preferably performed in a solvent chosen from polar solvents.

According to the controlled block polymerization technique, it may also be envisaged to work under pressure.

The number of equivalents of monomer ($m_a$) of the block A and of monomer ($m_b$) of the block B reacted during the polymerization reaction may be identical or different. The term "number of equivalents" means the amounts (in moles) of material of the monomers ($m_a$) of block A and of the monomers ($m_b$) of block B used during the polymerization reaction.

The number of equivalents of monomer ($m_a$) of the block A is preferably from 2 to 100 eq, preferably from 5 to 80 eq, preferably from 10 to 70 eq and more preferentially from 20 to 60 eq.

The number of equivalents of monomer ($m_b$) of the block B is preferably from 2 to 50 eq, preferably from 3 to 40 eq, more preferentially from 4 to 20 eq and even more preferentially from 5 to 10 eq.

The number of equivalents of monomer ($m_a$) of the block A is advantageously greater than or equal to that of the monomer ($m_b$) of the block B.

Preferably, when the group E of the monomer ($m_a$) is a —CO—O— group, E being connected to the vinyl carbon via the carbon atom, the number of equivalents of monomer ($m_a$) of the block A is between 20 and 60 mol, and G is chosen from $C_4$ to $C_{30}$ hydrocarbon-based chains.

Even more preferentially, when the group E of the monomer ($m_a$) is a —CO—O— group, E being connected to the vinyl carbon via the carbon atom, the number of equivalents of monomer ($m_a$) of the block A is between 20 and 60 mol, and G is chosen from $C_4$ to $C_{30}$ hydrocarbon-based chains, and the copolymer has a number-average molecular mass (Mn) ranging from 1000 to 10 000 g·mol$^{-1}$.

In addition, the weight-average molar mass $M_w$ of the block A or of the block B is preferably less than or equal to 15000 g·mol.$^{-1}$, more preferentially less than or equal 20 to 10 000 g·mol.$^{-1}$.

The block copolymer advantageously comprises at least one sequence of blocks AB, ABA or BAB in which said blocks A and B form a sequence without the presence of an intermediate block of different chemical nature.

Other blocks may optionally be present in the block copolymer described previously insofar as these blocks do not fundamentally change the nature of the block copolymer. However, block copolymers containing only blocks A and B will be preferred.

Advantageously, A and B represent at least 70% by mass, preferably at least 90% by mass, more preferentially at least 95% by mass and even more preferentially at least 99% by mass of the block copolymer.

According to a particular embodiment, the block copolymer is a diblock copolymer.

According to another particular embodiment, the block copolymer is a triblock copolymer containing alternating blocks comprising two blocks A and one block B (ABA) or comprising two blocks B and one block A (BAB).

According to a particular embodiment, the block copolymer also comprises an end chain I consisting of a cyclic or acyclic, saturated or unsaturated, linear or branched $C_1$ to $C_{32}$, preferably $C_4$ to $C_{24}$ and more preferentially $C_{10}$ to $C_{24}$ hydrocarbon-based chain.

The term "cyclic hydrocarbon-based chain" means a hydrocarbon-based chain of which at least part is cyclic, notably aromatic. This definition does not exclude hydrocarbon-based chains comprising both an acyclic part and a cyclic part.

The end chain I may comprise an aromatic hydrocarbon-based chain, for example benzene-based, and/or a saturated and acyclic, linear or branched hydrocarbon-based chain, in particular an alkyl chain.

The end chain I is preferably chosen from alkyl chains, which are preferably linear, more preferentially alkyl chains of at least 4 carbon atoms and even more preferentially of at least 12 carbon atoms.

For the ATRP polymerization, the end chain I is located in the end position of the block copolymer. It may be introduced into the block copolymer by means of the polymerization initiator. Thus, the end chain I may advantageously constitute at least part of the polymerization initiator and is positioned within the polymerization initiator so as to make it possible to introduce, during the first step of polymerization initiation, the end chain I in the end position of the block copolymer.

The polymerization initiator is chosen, for example, from the free-radical initiators used in the ATRP polymerization process. These free-radical initiators well known to those skilled in the art are notably described in the article "Atom transfer radical polymerization: current status and future perspectives, Macromolecules, 45, 4015-4039, 2012".

The polymerization initiator is chosen, for example, from alkyl esters of a carboxylic acid substituted with a halide, preferably a bromine in the alpha position, for example ethyl 2-bromopropionate, ethyl α-bromoisobutyrate, benzyl chloride or bromide, ethyl α-bromophenylacetate and chloroethylbenzene. Thus, for example, ethyl 2-bromopropionate may make it possible to introduce into the copolymer the end chain I in the form of a $C_2$ alkyl chain and benzyl bromide in the form of a benzyl group.

For the RAFT polymerization, the transfer agent may conventionally be removed from the copolymer at the end of polymerization according to any known process.

According to one variant, the end chain I may also be obtained in the copolymer by RAFT polymerization according to the methods described in the article by Moad, G. and co., Australian Journal of Chemistry, 2012, 65, 985-1076. For example, the end chain I may be modified by aminolysis when a transfer agent is used to give a thiol function. Examples that may be mentioned include transfer agents of thiocarbonylthio, dithiocarbonate, xanthate, dithiocarbamate and trithiocarbonate type, for example $S,S_0$-dibenzyl trithiocarbonate (DBTTC), S,S-bis(α,α'-dimethyl-α"-acetic acid) trithiocarbonate (BDMAT) or 2-cyano-2-propyl benzodithioate (CPD).

According to a known process, the transfer agent may be cleaved at the end of polymerization by reacting a cleaving agent such as $C_2$-$C_6$ alkylamines; the end function of the copolymer may in this case be a thiol group —SH.

According to another process described in patent EP 1 751 194, the sulfur of the copolymer obtained by RAFT polymerization introduced by the sulfur-based transfer agent such as thiocarbonylthio, dithiocarbonate, xanthate, dithiocarbamate and trithiocarbonate may be converted so as to remove the sulfur from the copolymer.

According to a particular embodiment, the block copolymer is a diblock copolymer. The block copolymer structure may be of the IAB or IBA type, advantageously IAB. The end chain I may be directly linked to block A or B according to the structure IAB or IBA, respectively, or may be connected via a bonding group, for example an ester, amide, amine or ether function. The bonding group then forms a bridge between the end chain I and block A or B.

According to a particular embodiment, the block copolymer may also be functionalized at the chain end according to any known process, notably by hydrolysis, aminolysis and/or nucleophilic substitution.

The term "aminolysis" means any chemical reaction in which a molecule is split into two parts by reaction of an ammonia molecule or an amine. A general example of aminolysis consists in replacing a halogen of an alkyl group by reaction with an amine, with removal of hydrogen halide. Aminolysis may be used, for example, for an ATRP polymerization which produces a copolymer bearing a halide in the end position or for a RAFT polymerization to convert the thio, dithio or trithio bond introduced into the copolymer by the RAFT transfer agent into a thiol function.

An end chain I' may thus be introduced by post-functionalization of the block copolymer obtained by controlled block polymerization of the monomers ($m_a$) and ($m_b$) described above.

The end chain I' advantageously comprises a linear or branched, cyclic or acyclic $C_1$ to $C_{32}$, preferably $C_1$ to $C_{24}$ and more preferentially $C_1$ to $C_{10}$ hydrocarbon-based chain, even more preferentially an alkyl group, optionally substituted with one or more groups containing at least one heteroatom chosen from N and O, preferably N.

For an ATRP polymerization using a metal halide as catalyst, this functionalization may be performed, for example, by treating the copolymer IAB or IBA obtained by ATRP with a primary $C_1$ to $C_{32}$ alkylamine or a $C_1$ to $C_{32}$ alcohol under mild conditions so as not to modify the functions present on blocks A, B and I.

The quaternary ammonium group of block B described above may be acyclic or cyclic.

The acyclic quaternary ammonium group is advantageously chosen from trialkylammonium, iminium, amidinium, formamidinium, guanidinium and biguanidinium quaternary ammoniums, preferably trialkylammonium quaternary ammoniums.

The cyclic quaternary ammonium group is advantageously chosen from heterocyclic compounds containing at least one nitrogen atom, chosen in particular from pyrrolinium, pyridinium, imidazolium, triazolium, triazinium, oxazolium and isoxazolium quaternary ammoniums.

The quaternary ammonium group of block B is advantageously a quaternary ammonium, even more advantageously a quaternary trialkylammonium.

According to a preferred variant, at least one of the alkyl groups of the quaternary ammonium of block B is substituted with a hydroxyl group.

According to a particular embodiment, block B is preferably derived from a monomer ($m_b$) obtained by the reaction:
- of a tertiary amine of formula $NR_3R_4R_5$ or $R_6N=R_7$ in which $R_3$, $R_4$, $R_5$, $R_6$ and $R_7$ are as described above, and
- of a (meth)acrylate or (meth)acrylamide intermediate monomer $m_i$ of formula (XV) below:

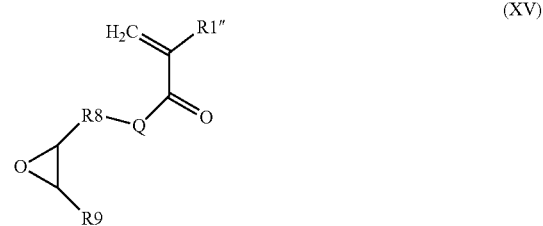

(XV)

in which:
Q, $R_1''$, $R_8$ and $R_9$ are as described above; the preferred variants of Q, $R_1''$, $R_8$ and $R_9$ according to formulae (II), (V) and (VI) as defined above are also preferred variants of formula (XV).

According to another particular embodiment, block B is obtained by post-functionalization of an intermediate polymer Pi comprising at least one block P of formula (XVI) below:

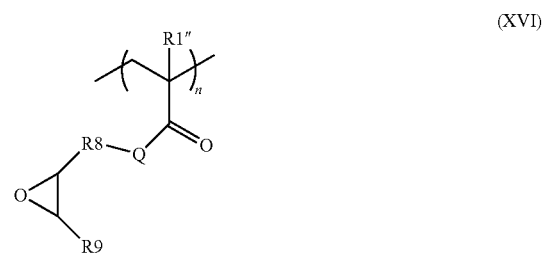

(XVI)

in which
$R_1''$, n, Q, $R_8$ and $R_9$ are as described above; the preferred variants of $R_1''$, n, Q, $R_8$ and $R_9$ according to formulae (II), (V), (VI) and (XII) as defined above are also preferred variants of formula (XVI).

The post-functionalization corresponds to the reaction of the intermediate polymer Pi with a tertiary amine of formula $NR_3R_4R_5$ or $R_6N=R_7$ in which $R_3$, $R_4$, $R_5$, $R_6$ and $R_7$ are as described previously.

The tertiary amine may be chosen, for example, from acyclic tertiary amines, preferably quaternizable trialkylamines, guanidines and imines. The tertiary amine is advantageously chosen from trialkylamines, in particular those in which the alkyl groups are identical or different and chosen independently from $C_1$ to $C_{18}$ and preferably $C_1$ to $C_{12}$ linear or branched, cyclic or acyclic, preferably acyclic, alkyls.

According to one variant, the tertiary amine may be chosen from cyclic tertiary amines, preferably quaternizable pyrrolines, pyridines, imidazoles, triazoles, guanidines, imines, triazines, oxazoles and isoxazoles.

The intermediate polymer Pi may also comprise at least one block A as described above.

According to a particular embodiment, block B of formula (XII) is obtained by quaternization, according to any known process, of a tertiary amine corresponding to the quaternary ammonium group of block B of formula $NR_3R_4R_5$ or $R_6N=R_7$ in which $R_3$, $R_4$, $R_5$, $R_6$ and $R_7$ are as defined above.

The quaternization step may be performed before the copolymerization reaction, on an intermediate monomer bearing the tertiary amine, for example by reaction with an alkyl halide or an epoxide (oxirane) according to any known process, optionally followed by an anion exchange reaction.

The quaternization step may also be performed by post-functionalization of an intermediate polymer bearing the tertiary amine, for example by reaction with an alkyl halide optionally followed by an anion exchange reaction. An example of a quaternization that may be mentioned is a post-functionalization reaction of an intermediate polymer bearing the tertiary amine, by reaction with an epoxide (oxirane) according to any known process.

It is preferred to copolymerize intermediate monomers bearing a tertiary amine function and then, in a second step, to functionalize the intermediate copolymer obtained by quaternization of the tertiary amine present in the intermediate copolymer, rather than to copolymerize monomers that are already quaternized.

In addition, quaternization involving an epoxide will preferably be performed.

The fuel additive composition may advantageously comprise from 5% to 99% by mass, preferably from 10% to 80% and more preferentially from 25% to 70% of copolymer as described previously relative to the total mass of the additive composition.

The Amine Substituted with a Polyalkenyl Group (b)

The fuel additive composition according to the invention also comprises at least one amine substituted with a polyalkene or polyalkenyl group (b).

In the continuation of the description, the expressions "polyalkenyl group" and "polyalkene group" will be used without preference to denote a group derived from a polyalkene.

The amines substituted with a polyalkene group (b) may be prepared from at least one polyolefin and from at least one amine, said amine being notably chosen from ammonia, monoamines, polyamines and mixtures thereof. The amines substituted with a polyalkene group may be prepared according to any known process, notably via the processes described in US 2008/0113890.

Nonlimiting examples that may be mentioned include the reaction of a halogenated olefinic polymer with an amine; the reaction of a hydroformyl olefin with a polyamine followed by hydrogenation of the reaction product; the conversion of a polyalkene into the corresponding epoxide followed by conversion of the epoxide into a polyalkene amine by reductive amination; the hydrogenation of a β-aminonitrile; and the hydroformylation of a polybutene or polyisobutylene in the presence of a catalyst, of carbon monoxide CO and of dihydrogen $H_2$ at high pressure and high temperature.

The olefinic monomers from which the olefinic polymers are prepared comprise polymerizable olefinic monomers characterized by the presence of one or more ethylenic unsaturations, for example ethylene, propylene, 1-butene, isobutene, 1-octene, 1,3-butadiene and isoprene.

The olefinic monomers are generally polymerizable terminal olefins. However, polymerizable internal olefinic monomers may also be used to form polyalkenes.

For nonlimiting purposes, among the terminal and/or internal olefinic monomers that may be used for preparing the polyalkenes according to any known process, mention may notably be made of: ethylene; propylene; butenes, including 1-butene, 2-butene and isobutylene or isobutene; 1-pentene; 1-hexene; 1-heptene; 1-octene; 1-nonene; 1-decene; 2-pentene; propylene tetramer; diisobutylene; isobutylene trimer; 1,2-butadiene; 1,3-butadiene; 1,2-pentadiene; 1,3-pentadiene; 1,4-pentadiene; isoprene; 5-hexadiene; 2-methyl-5-propyl-1-hexene; 3-pentene; 4-octene and 3,3-dimethyl-1-pentene.

Preferably, the amine substituted with a polyalkenyl group (b) is substituted with a $C_8$-$C_{500}$ and more preferentially $C_{12}$-$C_{150}$ polyalkene group.

More preferentially, the polyalkene group has a number-average molecular mass ranging from 200 to 5000 g/mol, preferably from 400 to 3000, more preferentially from 500 to 2500 and even more preferentially from 800 to 1500, the number-average molecular mass being determined by gel permeation chromatography (GPC), also known as size exclusion chromatography (SEC), using the starting polymer.

The amine used for preparing the amine substituted with a polyalkenyl group (b) may be chosen from ammonia, monoamines and polyamines, alone or as mixtures, including mixtures of different monoamines, mixtures of different polyamines, and mixtures of monoamines and of polyamines (including diamines).

The monoamine or polyamine advantageously comprises at least one primary or secondary amine.

Preferably, the monoamine or polyamine is substituted with at least one hydrocarbon-based group chosen from an optionally cyclic aliphatic group; an aromatic group or a heterocyclic group.

According to a first embodiment, the amine is a monoamine.

Preferably, the monoamine is substituted with at least one hydrocarbon-based group containing from 1 to 50 carbon atoms, preferably from 1 to 30 carbon atoms.

According to a first variant, the monoamine is substituted with at least one aliphatic hydrocarbon-based group, which is preferably saturated.

Examples that may be mentioned include: methylamine, ethylamine, diethylamine, 2-ethylhexylamine, bis(2-ethylhexyl)amine, n-butylamine, di-n-butylamine, allylamine, isobutylamine, cocamine, stearylamine, laurylamine, methyllaurylamine and oleylamine.

According to a second variant, the monoamine is substituted with at least one optionally substituted aromatic group, the aromatic group being connected to the nitrogen atom of the amine via one of the carbon atoms of the aromatic ring.

Preferably, when the aromatic group is substituted, the substituent group is chosen from a linear or branched, cyclic or acyclic aliphatic hydrocarbon-based chain, optionally comprising one or more heteroatoms.

As monoamines substituted with an aromatic group, examples that may be mentioned include: aniline, bis(para-methylphenyl)amine and naphtylamine.

As monoamines substituted with a substituted aromatic group, examples that may be mentioned include: N-(n-butyl) aniline, para-dodecylaniline, cyclohexylaminonaphthylamine and thienylaniline.

According to a third variant, the monoamine is substituted with at least one group comprising a hydroxyl group —OH.

Preferably, according to this third variant, the monoamine is substituted with at least one hydroxyalkyl chain.

Examples that may be mentioned include ethanolamine, bis(3-propanol)amine, 4-hydroxybutylamine, diethanolamine and N-methyl-2-hydroxypropylamine.

According to a fourth variant, the monoamine is substituted with a heterocyclic group, the heterocyclic group not comprising any amine nitrogen atoms. Heterocyclic monoamines are known to those skilled in the art.

According to a second embodiment, the amine is a polyamine.

Preferably, the polyamine is chosen from polyamines substituted with polyalkene groups.

The polyamine may be substituted with one or more aliphatic, cycloaliphatic, heterocyclic or aromatic hydrocarbon-based groups.

Examples that may be mentioned include polyalkylenepolyamines, hydroxylated polyamines, arylpolyamines and heterocyclic polyamines.

According to a first variant, the polyamine is chosen from the polyalkylenepolyamines of formula (XVII) below:

$$H_2N-(R_{10}NH)_q-H \quad \text{(XVII)}$$

in which:
the groups $R_{10}$ are independently chosen from $C_1$-$C_5$ and preferably $C_2$-$C_3$ alkylene chains, and
q is an integer ranging from 1 to 10, preferably ranging from 3 to 5.

Preferably, the groups $R_{10}$ are all identical.

Even more preferentially, the polyalkylenepolyamine is chosen from the polyethylenepolyamines of formula (XVIII) below:

$$H_2N-(CH_2CH_2NH)_q-H \quad \text{(XVIII)}$$

in which q is an integer ranging from 1 to 10, preferably ranging from 3 to 5.

Advantageously, the polyethylenepolyamine is chosen from ethylenediamine, triethylenetetramine, tetraethylenepentamine and pentaethylenehexamine.

More advantageously, the polyethylenepolyamine is tetraethylenepentamine.

According to a second variant, the polyamine is chosen from hydroxylated polyamines. For the purposes of the invention, the term "hydroxylated polyamine" means a polyamine substituted with at least one group comprising at least one hydroxyl function —OH.

Preferably, the polyamine is chosen from polyamines substituted with one or more polyalkene groups and in which at least one or more nitrogen atoms is substituted with a hydroxyalkyl chain. These compounds may be prepared according to any known process and notably by reaction of polyamines substituted with one or more polyalkene groups with one or more alkylene oxides.

Examples that may be mentioned include N-(2-hydroxyethyl)ethylenediamine, N,N-bis(2-hydroxyethyl)ethylenediamine, 1-(2-hydroxyethyl)piperazine, monohydroxypropyldiethylenetriamine, dihydroxypropyltetraethylenepentamine and N-(3-hydroxybutyl)tetramethylenediamine.

According to a third variant, the polyamine is chosen from arylpolyamines.

The arylpolyamines are analogous to the monoamines substituted with an aromatic group described above with the exception of the presence in their structure of another amine nitrogen.

Examples that may be mentioned include N,N'-bis(n-butyl)-para-phenylenediamine and bis(para-aminophenyl) methane.

Preferably, the polyamine is chosen from polyalkylenepolyamines, more preferentially from polyethylenepolyamines for reasons of cost and efficiency.

Examples of amines substituted with polyalkene groups may comprise: polypropylene amine, polybutene amine, N,N-dimethyl-polyisobutylene-amine, N-polybutene-morpholine, N-polybutene-ethylenediamine, N-polypropylene trimethylenediamine, N-polybutene-diethylenetriamine, N',N'-polybutene-tetraethylenepentamine and N,N-dimethyl-N'-polypropylene-1,3-propylenediamine.

According to a preferred embodiment, the amines substituted with a polyalkenyl group (b) are selected from polyisobutene amines.

For the purposes of the invention, the term "polyisobutene amine" means an amine, monoamine or polyamine, substituted with at least one polyisobutenyl chain. Polyisobutene amines are also known as polyisobutylene amines or PIB-amines or PIBAs.

Preferably, the polyisobutenyl chain is a homopolymer obtained from isobutylene monomers.

According to a particular embodiment, the polyisobutenyl chain may contain up to 20% by mass, relative to the total mass of the polymer, of units derived from one or more monomers other than isobutylene, for instance n-butene, propene and mixtures thereof.

Examples of polyisobutene amines include those obtained by performing the methods described in U.S. Pat. Nos. 4,832,702, 6,140,541, 6,909,017 or 7,753,970.

Preferably, the polyisobutene amine corresponds to formula (XIX) below:

in which
$R_{11}$ is a polyisobutenyl chain as described above,
$R_{12}$ and $R_{13}$ are independently chosen from:
a hydrogen atom,
an aliphatic or aromatic hydrocarbon-based group, preferably chosen from alkyl, aryl and alkyl groups,
a primary or secondary, aliphatic or aromatic aminoalkylene or polyalkylenepolyamine group,
a polyoxyalkylene group,
an optionally substituted heterocyclic group, or
$R_{12}$ and $R_{13}$ form, with the nitrogen atom to which they are attached, a heterocycle, said heterocycle possibly comprising other heteroatoms and possibly being substituted.

Preferentially, at least one of the groups $R_{12}$ and $R_{13}$ is chosen from polyoxyalkylene groups.

Preferably, the polyoxyalkylene group is represented by formula (XX) below:

in which
the groups $R_{18}$ are independently chosen from $C_2$-$C_6$ and preferably $C_2$-$C_3$ alkylene groups,
X is a hydrogen atom or an alkyl group, and
o is an integer ranging from 1 to 30.

According to a particular embodiment, the group $R_{11}$ comprises from 20 to 400 carbon atoms.

Preferably, according to this particular embodiment, the group $R_{11}$ consists of a chain of structural units derived from a mixture of monomers comprising isobutene monomers and up to 20% by mass, relative to the total mass of monomers, of n-butene.

The fuel additive composition according to the invention may advantageously comprise from 5% to 99% by mass, preferably from 10% to 80% by mass and more preferentially from 25% to 70% by mass of amine compound substituted with a polyalkenyl group (b) relative to the total mass of the additive composition.

Advantageously, in the fuel additive composition according to the invention, the mass ratio between the copolymer(s) (a) and the amine compound(s) substituted with a polyalkenyl group (b) described above is from 5:95 to 95:5, preferably from 10:90 to 90:10.

The Carrier Oil (c)

According to a particular embodiment, the fuel additive composition as described previously is used in combination with at least one carrier oil (c), also known as carrier fluid, induction adjuvant or fluidizer.

According to a first variant, the fuel additive composition according to the invention comprises at least one carrier oil (c), and preferably is dissolved in a carrier oil (c).

According to a second variant, the carrier oil (c) and the fuel additive composition as defined above are provided separately.

Examples of suitable carrier oils are described in US 2009/0071065 in paragraphs [0038] to [0053].

Thus, examples of carrier oils that may be mentioned include: liquid oligomers of poly-α-olefins; liquid hydrocarbons of polyalkenes, notably polypropylene, polybutene and polyisobutene, and also derivatives thereof; liquid hydrocarbons of hydrotreated polyalkenes, notably hydrotreated polypropylene, hydrotreated polybutene, hydrotreated polyisobutene and derivatives thereof; mineral oils; liquid compounds of poly(oxyalkylene) type; liquid alcohols and polyols; liquid esters, derivatives thereof and mixtures thereof.

Preferably, the carrier oil is chosen from:
(1) a mineral oil or a mixture of mineral oils, preferably with a viscosity index, determined according to the standard ASTM D2270, of less than 120,
(2) a poly-α-olefin (PAO) or a mixture of poly-α-olefins, preferably with a mass-average molecular mass ranging from 500 to 1500 g·mol$^{-1}$,
(3) a polyether or a mixture of polyethers, and notably of poly(oxyalkylene) compounds, preferably with a mass-average molecular mass of from 500 to 1500 g·mol$^{-1}$,
(4) one or more liquid polyalkylenes, and
(5) mixtures thereof.

When the carrier oil is chosen from mineral oils, it is preferably selected from paraffinic oils, naphthenic oils, asphaltic oils and mixtures thereof.

Preferentially, the mineral oil is chosen from hydrotreated oils.

When the carrier oil is chosen from poly-α-olefins, it is preferably selected from hydrotreated poly-α-olefins and non-hydrotreated poly-α-olefins.

More preferentially, the poly-α-olefins are chosen from trimers, tetramers or pentamers of α-olefinic monomers, said α-olefinic monomers each comprising from 6 to 12 carbon atoms.

When the carrier oil is chosen from polyethers, it is preferably selected from poly(oxyalkylenes).

More preferentially, the poly(oxyalkylenes) have a mass-average molecular mass ranging from 500 to 1500 g·mol$^{-1}$.

Examples of polyethers that may notably be mentioned include hydrocarbyl-terminated poly(oxyalkylene) monoalcohols.

Examples of poly(oxyalkylene) compounds that may notably be mentioned include poly(oxyalkylene) monoalcohols and mixtures of poly(oxyalkylene) monoalcohols substituted with an alkyl group. In undiluted form, these compounds are in the form of a gasoline-soluble liquid and have a viscosity of at least 70 cSt at 40° C. and of at least 13 cSt at 100° C. These compounds notably include monools formed by propoxylation of one or more alkanols each comprising at least 8 carbon atoms, preferably from 10 to 18 carbon atoms.

Preferentially, the carrier oils of poly(oxyalkylene) type have a viscosity in undiluted form, determined according to the standard ASTM D445, of at least 60 cSt at 40° C., more preferentially of at least 70 cSt, and of at least 11 cSt at 100° C., more preferentially of at least 13 cSt.

Preferentially, the carrier oils of poly(oxyalkylene) type have a viscosity in undiluted form of not more than 400 cSt at 40° C., more preferentially of not more than 300 cSt, and not more than 50 cSt at 100° C., more preferentially not more than 40 cSt.

Among the poly(oxyalkylenes), mention may notably be made of poly(oxyalkylene) glycols and derivatives thereof of monoether type, notably those which meet the viscosity requirements described above. This notably includes compounds that are obtained or that may be obtained by reaction between an alcohol or polyalcohol and an alkylene oxide, for instance propylene oxide and/or butylene oxide, with or without the use of ethylene oxide. Typically, at least 80 mol % of the oxyalkylene groups present in these compounds are derived from or may be derived from 1,2-propylene groups.

Examples of poly(oxyalkylene) compounds also comprise those described in and/or which are obtained or which may be obtained by performing the processes described in U.S. Pat. Nos. 2,425,845, 2,425,755 and 2,457,139.

The carrier oils of poly(oxyalkylene) type must contain a sufficient amount of branched oxyalkylene units, for example of methyldimethyleneoxy and/or of ethyldimethyleneoxy units, in order for the latter to be sufficiently soluble in the fuel.

When the carrier oil is chosen from polyalkylenes, it is preferably selected from polypropenes, polybutenes, polyisobutenes, polyamylenes, copolymers of propene and butene, copolymers of butene and isobutene, copolymers of propene and isobutene and copolymers of propene, butene and isobutene, and mixtures thereof. Examples of polyalkylenes that may notably be mentioned include hydrotreated polypropylenes, hydrotreated polybutenes, hydrotreated polyisobutenes and also derivatives thereof.

Preferably, the polybutenes have a narrow molecular mass distribution, for example expressed as the Mw/Mn ratio, Mw denoting the mass-average molecular mass of the polybutene and Mn denoting the number-average molecular mass of the polybutene. This ratio is sometimes referred to as the polydispersity index of the polybutene. Preferably, the Mw/Mn ratio of the polybutenes is not more than 1.4, Mw denoting the mass-average molecular mass of the polybutene and Mn denoting the number-average molecular mass of the polybutene.

Examples that may be mentioned include the polybutenes described in U.S. Pat. No. 6,048,373. The methods for determining the mass-average molecular mass comprise static light scattering, small-angle neutron scattering, X-ray scattering and the sedimentation rate. The number-average molecular mass (Mn) may be determined by gel permeation chromatography (GPC).

Preferably, the carrier oil is chosen from polyethers, more preferentially from poly(oxyalkylenes).

Advantageously, in the additive composition according to the invention, the ratio between the mass of carrier oil (c) and the total mass of detergent additives present in the additive composition ranges from 0.4 to 2, preferably from 0.6 to 1.4.

Not only the copolymer(s) (a) and the amine(s) substituted with a polyalkenyl group (b) defined above, but also all of the other optional detergent additives that may be added and as defined in the application hereinbelow are included in the category of detergent additives.

Preferably, the ratio between the mass of carrier oil (c) and the sum of the masses of copolymer(s) (a) and of amine compounds(s) substituted with a polyalkenyl group (b) described above ranges from 0.1 to 2, preferably from 0.3 to 1.2 and more preferentially from 0.4 to 0.8.

According to an alternative embodiment, the additive composition according to the invention is free of carrier oil.

Uses

The fuel additive composition described above is particularly advantageous when it is used as detergent additive in a liquid fuel for a spark ignition engine or a gasoline compression ignition (GCI) engine.

The term "detergent additive for liquid fuel" means an additive which is incorporated in small amount into the liquid fuel and produces an effect on the cleanliness of said engine when compared with said liquid fuel that is not additive-enhanced.

The liquid fuel is advantageously derived from one or more sources chosen from the group consisting of mineral, animal, plant and synthetic sources. Oil will preferably be chosen as mineral source.

The liquid fuel is preferably chosen from hydrocarbon-based fuels and fuels that are not essentially hydrocarbon-based, alone or as a mixture.

The term "hydrocarbon-based fuel" means a fuel constituted of one or more compounds constituted solely of carbon and hydrogen.

The term "fuel not essentially hydrocarbon-based" means a fuel constituted of one or more compounds not essentially constituted of carbon and hydrogen, i.e. which also contain other atoms, in particular oxygen atoms.

The hydrocarbon-based fuels notably comprise middle distillates with a boiling point ranging from 100° C. to 500° C. or lighter distillates with a boiling point in the gasoline range. These distillates may be chosen, for example, from the distillates obtained by direct distillation of crude hydrocarbons, vacuum distillates, hydrotreated distillates, distillates derived from the catalytic cracking and/or hydrocracking of vacuum distillates, distillates resulting from conversion processes such as ARDS (atmospheric residue desulfurization) and/or viscoreduction, and distillates derived from the upgrading of Fischer-Tropsch fractions. Mention may also be made of hydrocarbon-based fuels resulting from BTL (biomass-to-liquid) conversion, which are notably available from the company Ekobenz. The hydrocarbon-based fuels are typically gasolines.

Advantageously, the hydrocarbon-based fuel is chosen from gasolines.

Gasolines in particular comprise any commercially available fuel composition for spark ignition engines or for GCI engines. A representative example that may be mentioned concerns the gasolines corresponding to standard NF EN 228. Gasolines generally have octane numbers that are high enough to avoid pinking. Typically, the fuels of gasoline type sold in Europe, in accordance with standard NF EN 228, have a motor octane number (MON) of greater than 85 and a research octane number (RON) of at least 95. Fuels of gasoline type generally have an RON ranging from 90 to 100 and an MON ranging from 80 to 90, the RON and MON being measured according to the standard ASTM D 2699-86 or D 2700-86.

Fuels that are not essentially hydrocarbon-based notably comprise oxygen-containing fuels, for example bioethanols resulting from BTL (biomass-to-liquid) conversion of plant and/or animal biomass, notably from the conversion of the sugars and/or the lignocellulose derived from biomass, or biofuels, consisting, for example, of ether compounds such as methyl tert-butyl ether (MTBE), ethyl tert-butyl ether (ETBE) or diisopropyl ether (DIPE).

Mixtures of hydrocarbon-based fuel and of fuel that is not essentially hydrocarbon-based are typically gasolines of $E_x$ type.

The term "gasoline of $E_x$ type for a spark ignition engine or for a GCI engine" means a gasoline fuel which contains x % (v/v) of oxygen-based compounds, generally ethanol, bioethanol, methyl tert-butyl ether (MTBE) and/or ethyl tert-butyl ether (ETBE).

The sulfur content of the liquid fuel is preferably less than or equal to 5000 ppm, preferably less than or equal to 500 ppm and more preferentially less than or equal to 50 ppm, or even less than 10 ppm and advantageously sulfur-free.

The fuel additive composition described above is used in the liquid fuel in a content advantageously of at least 10 ppm, preferably at least 50 ppm, more preferentially in a content from 10 to 5000 ppm, even more preferentially from 10 to 1000 ppm. According to a particular embodiment, the use of a fuel additive composition as described previously in the liquid fuel makes it possible to maintain the cleanliness of at least one of the internal parts of the spark ignition engine or GCI engine and/or to clean at least one of the internal parts of the spark ignition engine or GCI engine.

The use of the fuel additive composition according to the invention in the liquid fuel makes it possible in particular to limit or prevent the formation of deposits in at least one of the internal parts of said engine ("keep-clean" effect) and/or to reduce the existing deposits in at least one of the internal parts of said engine ("clean-up" effect). Thus, the use of the fuel additive composition according to the invention in the liquid fuel makes it possible, when compared with liquid fuel that is not specially additive-enhanced, to limit or prevent the formation of deposits in at least one of the internal parts of said engine or to reduce the existing deposits in at least one of the internal parts of said engine.

Advantageously, the use of the fuel additive composition according to the invention in the liquid fuel makes it possible to observe both effects simultaneously, limitation (or prevention) and reduction of deposits ("keep-clean" and "clean-up" effects).

The deposits are distinguished as a function of the type of spark ignition engine or GCI engine and of the location of the deposits in the internal parts of said engine.

The deposits targeted are located in at least one of the internal parts of said spark ignition engine or of said GCI engine. The internal part of the spark ignition engine or GCI engine that is kept clean (keep-clean) and/or cleaned (clean-up) is advantageously chosen from the engine intake system, in particular the intake valves (IVD: intake valve deposit), the combustion chamber (CCD: combustion chamber deposit, or TCD: total chamber deposit) and the fuel injection system, in particular the injectors of an indirect-injection system (PFI: port fuel injector) or the injectors of a direct-injection system (DISI).

According to a first embodiment, the spark ignition engine or GCI engine is a direct-injection engine (DISI: direct-injection spark ignition engine).

The use of the fuel additive composition according to the invention in a direct-injection spark ignition engine or GCI engine makes it possible to limit or prevent the formation at high temperature of deposits in at least one of the internal parts of said engine or to reduce the existing deposits in at least one of the internal parts of said engine.

Preferably, according to this first embodiment, the deposits targeted are located on the injectors (GDI: gasoline direct injector).

According to a second embodiment, the spark ignition engine or GCI engine is an indirect-injection engine.

The use of the fuel additive composition according to the invention in an indirect-injection spark ignition engine or GCI engine then makes it possible to limit or prevent the formation at high temperature of deposits in at least one of the internal parts of said engine or to reduce the existing deposits in at least one of the internal parts of said engine.

Preferably, according to this second embodiment, the deposits targeted are located on the intake valves (IVD: intake valve deposit).

The use of the fuel additive composition according to the invention in an indirect-ignition spark ignition engine or GCI engine also makes it possible to prevent and/or impede and/or limit and/or delay the formation of deposits, notably at low temperature, on the intake valves.

More particularly, the use of the additive composition according to the invention in an indirect-ignition spark ignition engine or GCI engine makes it possible to prevent and/or impede and/or limit and/or delay the phenomenon of valve sticking.

The deposits may be constituted of coking-related deposits and/or deposits of soap and/or lacquering type.

Advantageously, the use of the fuel additive composition as described above makes it possible, when compared with liquid fuel that is not specially additive-enhanced, to limit or prevent the formation of deposits on at least one type of deposit described previously and/or to reduce the existing deposits on at least one type of deposit described previously.

According to a particular embodiment, the use of the fuel additive composition described above also makes it possible to reduce the fuel consumption of a spark ignition engine or a GCI engine.

According to another particular embodiment, the use of the fuel additive composition described above also makes it possible to reduce the pollutant emissions, in particular the particle emissions of a spark ignition engine or a GCI engine.

Advantageously, the use of the fuel additive composition according to the invention makes it possible to reduce both the fuel consumption and the pollutant emissions.

The fuel additive composition described above may be used alone or mixed with other additives in the form of an additive concentrate.

The fuel additive composition according to the invention may be added to the liquid fuel in a refinery and/or may be incorporated downstream of the refinery and/or optionally as a mixture with other additives in the form of an additive concentrate, also known by the common name "additive package".

According to one embodiment, the fuel additive composition described above is used as a mixture with an organic liquid in the form of a concentrate.

According to a particular embodiment, a concentrate for fuel comprises one or more copolymers (a), one or more amines substituted with a polyalkenyl group (b) and optionally one or more carrier oils (c), as described above, as a mixture with an organic liquid.

The organic liquid is inert with respect to the copolymer (a), the amine(s) substituted with a polyalkenyl group (b) and the optional carrier oil(s) (c) described above, and is miscible with the liquid fuel described previously. The term "miscible" describes the fact that the copolymer (a), the amine substituted with a polyalkenyl group (b), optionally the carrier oil (c) and the organic liquid form a solution or a dispersion so as to facilitate the mixing of the fuel additive composition according to the invention in the liquid fuels according to the standard fuel additive enhancement processes.

The organic liquid is advantageously chosen from aromatic hydrocarbon-based solvents such as the solvent sold under the name Solvesso, alcohols, ethers and other oxygen-based compounds and paraffinic solvents such as hexane, pentane or isoparaffins, alone or as a mixture.

The concentrate may advantageously comprise from 5% to 99% by mass, preferably from 10% to 80% and more preferentially from 25% to 70% of copolymer (a) as described previously.

The concentrate may typically comprise from 1% to 95% by mass, preferably from 10% to 70% and more preferentially from 25% to 60% of organic liquid, the remainder corresponding to the copolymer (a), the amine substituted with a polyalkenyl group (b) and optionally the carrier oil (c), it being understood that the concentrate may comprise one or more copolymers (a), one or more amines substituted with a polyalkenyl group (b) and optionally one or more carrier oils (c), as described above. In general, the solubility of the copolymer in the organic liquids and the liquid fuels described previously will notably depend on the weight-average and number-average molar masses $M_w$ and $M_n$, respectively, of the copolymer. The average molar masses $M_w$ and $M_n$ of the copolymer according to the invention will be chosen so that the copolymer is soluble in the liquid fuel and/or the organic liquid of the concentrate for which it is intended.

The average molar masses $M_w$ and $M_n$ of the copolymer according to the invention may also have an influence on the efficiency of the fuel additive composition according to the invention as a detergent additive. The average molar masses $M_w$ and $M_n$ will thus be chosen so as to optimize the effect of the copolymer according to the invention, notably the detergency effect (engine cleanliness) in the liquid fuels described above.

Optimizing the average molar masses $M_w$ and $M_n$ may be performed via routine tests accessible to those skilled in the art.

According to a particular embodiment, the copolymer (a) has a weight-average molar mass ($M_w$) ranging from 500 to 30 000 g·mol$^{-1}$, preferably from 1000 to 10 000 g·mol$^{-1}$, more preferentially less than or equal to 4000 g·mol$^{-1}$, and/or a number-average molar mass (Mn) ranging from 500 to 15000 g·mol$^{-1}$, preferably from 1000 to 10 000 g·mol$^{-1}$, more preferentially less than or equal to 4000 g·mol$^{-1}$. The number-average and weight-average molar masses are measured by size exclusion chromatography (SEC). The operating conditions of SEC, notably the choice of the solvent, will be chosen as a function of the chemical functions present in the block copolymer.

According to a particular embodiment, the fuel additive composition according to the invention is used in the form of an additive concentrate in combination with at least one other fuel additive for a spark ignition engine or a GCI engine other than the copolymer (a), the amine substituted with a polyalkenyl group (b) and the optional carrier oil (c), described previously.

The additive concentrate may typically comprise one or more other additives chosen from detergent additives other than the copolymer (a) and the amine substituted with a polyalkenyl group (b) described above, from anticorrosion agents, dispersants, demulsifiers, biocides, reodorants, friction modifiers, lubricity additives or oiliness additives, combustion aids (catalytic soot and combustion promoters), sedimentation-inhibiting agents, antiwear agents and conductivity modifiers.

Among these additives, mention may be made in particular of:

a) lubricity additives or antiwear agents, notably (but not limitingly) chosen from the group consisting of fatty acids and ester or amide derivatives thereof, notably glyceryl monooleate, and monocyclic and polycyclic carboxylic acid derivatives. Examples of such additives are given in the following documents: EP 680506, EP 860494, WO 98/04656, EP 915944, FR 2772783, FR 2772784.

b) detergent additives, notably (but not limitingly) chosen from the group consisting of succinimides, polyetheramines, Mannich bases and quaternary ammonium salts; for example those described in U.S. Pat. No. 4,171,959 and WO 2006/135881.

These other additives are generally added in an amount ranging from 10 to 1000 ppm (each), preferably from 100 to 1000 ppm.

The mole ratio and/or mass ratio between monomer ($m_b$) and monomer ($m_a$) in the copolymer described above and/or between blocks A and B when the copolymer is a block copolymer will be chosen so that the copolymer is soluble in the fuel and/or the organic liquid of the concentrate for which it is intended. Similarly, this ratio may be optimized as a function of the fuel and/or of the organic liquid so as to obtain the best effect on the engine cleanliness.

Optimizing the mole ratio and/or mass ratio may be performed via routine tests accessible to those skilled in the art.

According to a particular embodiment, the mole ratio between the monomer ($m_a$) and the monomer ($m_b$), or between blocks A and B as a molar percentage, is preferably between 95:5 and 50:50, more preferentially between 90:10 and 75:25, even more preferentially between 85:15 and 70:30.

According to a particular embodiment, a fuel composition is prepared according to any known process by additive-enhancing the liquid fuel described previously with at least one fuel additive composition as described above.

According to a particular embodiment, a fuel composition comprises:

(1) a fuel as described above, and
(2) a fuel additive composition as described previously.

The fuel (1) is chosen in particular from hydrocarbon-based fuels and fuels that are not essentially hydrocarbon-based described previously, taken alone or as a mixture.

The introduction, and notably the combustion, of this fuel composition comprising such a fuel additive composition in a spark ignition engine or in a GCI engine produces an effect on the cleanliness of the engine when compared with the liquid fuel that is not specially additive-enhanced. The introduction, and notably the combustion, of this fuel composition makes it possible in particular to prevent and/or reduce the fouling of the internal parts of said engine. These effects on engine cleanliness are as described previously in the context of the use of the fuel additive composition according to the invention.

According to a particular embodiment, the introduction, and notably the combustion, of the fuel composition comprising such an additive composition in a spark ignition engine or in a GCI engine also makes it possible to reduce the fuel consumption and/or the pollutant emissions.

The fuel additive composition according to the invention is preferably incorporated in low amount into the liquid fuel described previously, the amount of additive composition being sufficient to produce a detergent effect as described above and thus to improve the engine cleanliness.

According to a particular embodiment, the fuel composition comprises at least 1 ppm, preferably from 10 to 5000 ppm, more preferentially from 20 to 2000 ppm and in particular from 50 to 500 ppm of copolymer(s) (a) by mass relative to the total mass of the fuel composition.

According to an advantageous embodiment, the fuel composition comprises from 1 to 1000 ppm, preferably from 5 to 500 ppm, more preferentially from 10 to 200 ppm and even more preferentially from 20 to 100 ppm of copolymer(s) (a) by mass relative to the total mass of the fuel composition.

The fuel composition advantageously comprises from 1 to 1000 ppm of amine substituted with an alkenyl group (b) by mass relative to the total mass of the fuel composition, preferably from 5 to 500 ppm, more preferentially from 50 to 500 ppm and even more preferentially from 100 to 300 ppm.

According to a preferred embodiment, the fuel composition also comprises at least one carrier oil (c).

Preferably, according to this embodiment, the fuel composition comprises at least 10 ppm of carrier oil (c) by mass relative to the total mass of the fuel composition, preferably at least 20 ppm.

More preferentially, according to this embodiment, the fuel composition comprises from 10 to 1000 ppm of carrier oil (c), the contents being expressed on a mass basis relative to the total mass of the fuel composition, preferably from 20 to 500 ppm, more preferentially from 50 to 300 ppm.

According to a second alternative embodiment, the fuel composition is free of carrier oil.

Besides the fuel additive composition described above, the fuel composition may also comprise one or more additives other than the copolymer (a), the amine substituted with a polyalkenyl group (b) and the optional carrier oil (c) present in the fuel additive composition according to the invention. These additives are notably chosen from the other known detergent additives, for example from anticorrosion agents, dispersants, demulsifiers, biocides, reodorants, friction modifiers, lubricity additives or oiliness additives, combustion aids (catalytic soot and combustion promoters), sedimentation-inhibiting agents, antiwear agents and/or conductivity modifiers.

The additives other than the copolymer (a), the amine substituted with a polyalkenyl group (b) and the carrier oil (c) present in the fuel additive composition according to the invention are, for example, the fuel additives listed above.

According to a particular embodiment, a process for maintaining the cleanliness of (keep-clean) and/or for cleaning (clean-up) at least one of the internal parts of a spark ignition engine or of a GCI engine comprises the preparation of a fuel composition by additive enhancement of a fuel with a fuel additive composition as described above and the introduction, and notably the combustion, of said fuel composition in the spark ignition engine or in the GCI engine.

The internal part of the spark ignition engine or GCI engine that is kept clean and/or cleaned is preferably chosen from the engine intake system, in particular the intake valves (IVD), the combustion chamber (CCD or TCD) and the fuel injection system, in particular the injectors of an indirect-injection system (PFI) or the injectors of a direct-injection system (DISI).

The process for maintaining the cleanliness (keep-clean) and/or for cleaning (clean-up) comprises the successive steps of:
 a) determining the most suitable additive enhancement for the fuel, said additive enhancement corresponding to the selection of the fuel additive composition described above to be incorporated in combination, optionally, with other fuel additives as described previously and determining the degree of treatment necessary to achieve a given specification relative to the detergency of the fuel composition;
 b) incorporating into the fuel the selected fuel additive composition in the amount determined in step a) and, optionally, the other fuel additives.

The selection of the fuel additive composition more particularly corresponds to the selection firstly of one or more copolymers (a) as described previously and secondly of one or more amines substituted with a polyalkenyl group (b) as described previously and optionally of one or more carrier oils defined above, in order to prepare a fuel additive composition according to the invention.

The copolymer(s) (a), the amine(s) substituted with a polyalkenyl group (b) and the optional carrier oil(s) (c) may be incorporated into the fuel, alone or as a mixture, successively or simultaneously.

Alternatively, the fuel additive composition may be used in the form of a concentrate or of an additive concentrate as described above.

Step a) is performed according to any known process and falls within the common practice in the field of fuel additive enhancement. This step involves defining at least one representative feature of the detergency properties of the fuel composition.

The representative feature of the detergency properties of the fuel will depend on the type of engine, for example a spark ignition engine or a compression ignition engine (GCI engine), the direct or indirect type of injection system and the location in the engine of the deposits targeted for cleaning and/or cleanliness maintenance.

The representative feature of the detergency properties may, for example, correspond to the appearance of deposits on the interior or on the external parts of the injector. Methods for evaluating the detergency properties of fuels have been widely described in the literature and fall within the general knowledge of a person skilled in the art. Non-limiting examples that will be mentioned include the tests standardized or acknowledged by the profession or the following methods described in the literature: For indirect-injection spark ignition engines:
 the Mercedes Benz M102E method, standardized test method CEC F-05-A-93, and
 the Mercedes Benz M111 method, standardized test method CEC F-20-A-98.

These methods make it possible to measure the intake valve deposits (IVD) and the combustion chamber deposits (CCD), the tests generally being performed on a Eurosuper gasoline corresponding to the standard EN228.

For direct-injection spark ignition engines:
 the method described by the Applicant in the article "Evaluating Injector Fouling in Direct Injection Spark Ignition Engines", Mathieu Arondel, Philippe China, Julien Gueit; Conventional and future energy for automobiles; 10th international colloquium; Jan. 20-22, 2015, pages 375-386 (Technische Akademie Esslingen par Techn. Akad. Esslingen, Ostfildern), for the evaluation of the injector coking deposits, this method being cited by way of example;
 the method described in US 2013/0104826 for the evaluation of the injector coking deposits, this method being cited by way of example;
 the "VW DISI" method described in the article "Characterization of Gasoline Fuels in a DISI Engine", D. Weissenberger, J. Pibeam; 11th international colloquium; Jun. 27-27, 2017, page 97 (Technische Akademie Esslingen par Techn. Akad. Esslingen, Ostfildern), for the evaluation of the injector coking deposits, this method being cited by way of example. A European standard for evaluating coking deposits on the injector is currently in the course of development on the basis of this method.

In order to evaluate the harmlessness of a fuel with respect to the appearance of the phenomenon of indirect-injection valve sticking, i.e. the capacity of said fuel to prevent and/or impede and/or limit and/or delay the formation, notably at low temperature, of deposits on the intake valves, it is possible to evaluate the quality of the leaktightness of the combustion chamber valve(s) by performing, for example, compression measurements.

Mention will be made, for example, in a nonlimiting manner, of the test method described in the standard CEC F-16-T-96.

The amount of copolymer (a), the amount of amine substituted with a polyalkenyl group (b) and the optional amount of carrier oil (c) to be added to the fuel composition to achieve the specification will typically be determined by comparison with the fuel composition but without the copolymer (a), without the amine substituted with a polyalkenyl group (b) and without the carrier oil (c).

The amount of fuel additive composition to be added to the fuel composition to achieve the specification (step a) described previously will typically be determined by comparison with the fuel composition but without the copolymer (a), without the amine substituted with a polyalkenyl group (b) and without the carrier oil (c) present in the fuel additive composition according to the invention, the specification given relative to the detergency possibly being, for example, a target intake valve fouling (IVD) value according to the method M102E or an injection time drift or injector flow loss value according to the "VW DISI" method mentioned above.

The amount of copolymer (a), of amine substituted with a polyalkenyl group (b) and of carrier oil (c) may also vary as a function of the nature and origin of the fuel, in particular as a function of the content of compounds bearing n-alkyl, isoalkyl or n-alkenyl substituents. Thus, the nature and origin of the fuel may also be a factor to be taken into consideration for step a).

The process for maintaining the cleanliness (keep-clean) and/or for cleaning (clean-up) may also comprise an additional step after step b) of checking the target reached and/or of adjusting the degree of additive enhancement with the additive composition as detergent additive.

The fuel additive composition according to the invention has noteworthy properties as detergent additive in a liquid fuel, in particular in a gasoline fuel.

The fuel additive composition according to the invention is particularly noteworthy notably because it is effective as a detergent additive for a wide range of liquid fuels and/or for one or more types of motorization and/or against several types of deposit that form in the internal parts of spark ignition engines or GCI engines.

Notably, the fuel additive composition according to the invention is particularly effective in direct-ignition spark ignition engines or GCI engines for cleaning and limiting the formation of deposits on the injectors, but also in indirect-injection spark ignition engines or GCI engines for cleaning and limiting the formation of deposits on the intake valves, thus making it possible to prevent engine deterioration.

The invention is illustrated by the following examples, which are given without any implied limitation.

Examples

1. Synthesis of a Block Copolymer Starting with 2-Ethylhexyl Acrylate (EHA) and 2-Dimethylaminoethyl Acrylate (DMAEA) and Quaternization with 1,2-Epoxybutane The copolymer is obtained by reversible addition-fragmentation chain-transfer (RAFT) radical polymerization according to the following protocol.

A—Materials
Reaction Products:
  Polymerization initiator: α,α'-azoisobutyronitrile, AIBN (CAS 78-67-1),
  RAFT transfer agent: 2-cyano-2-propyl dodecyl trithiocarbonate >97%, CPDTTC (CAS 870196-83-1),
To Obtain Block A—Monomers ($m_a$):
  98% 2-ethylhexyl acrylate, EHA (CAS 103-11-7),
To Obtain Block B—Monomers ($m_b$):
  98% 2-dimethylaminoethyl acrylate, DMAEA (CAS 2439-35-2)
  Quaternizing agent:
  99% 1,2-epoxybutane (CAS 106-88-7).

B—Equipment
The various items of equipment used for the characterization of the copolymer are described below.
High Pressure Liquid Chromatography (HPLC):
  The chromatograph used is an UltiMate 300 HPLC sold by the company Thermo Fischer.
  The stationary phase is a Symmetry Shield RP 18 column.
  The mobile phase consists of:
  a water/methanol mixture in a 95/5 volume ratio supplemented with methanoic acid $CH_2O_2$ (CAS 64-18-6) so as to set the pH of the mixture at 5, or
  methanol supplemented with methanoic acid so as to set the pH of the mixture at 5.
  The flow rate of the mobile phase is equal to 1 mL/min. The oven temperature is set at 40° C. The injection volume is 5 μL. The products are detected via a diode array detector.

Nuclear Magnetic Resonance or NMR Spectroscopy:
  The $^1H$ and $^{13}C$ NMR spectroscopy analyses are performed in deuterated chloroform $CDCl_3$ with a Brüker Avance III 400 MHz spectrometer ($^1H$ Larmor frequency) operating under TopSpin 3.2: SEX 10 mm $^{13}C$ probe with pulsed magnetic field z-gradient and $^2H$ lock operating at 300K and BBI 5 mm $^1H$ probe with pulsed magnetic field z-gradient and $^2H$ lock operating at 300K. To perform the measurements, an external standard (1,2,4,5-tetrachloro-3-nitrobenzene or TCNB) is used.

Gel Permeation Chromatography (GPC):
  The GPC analyses are performed in THF (tetrahydrofuran) using a Waters Styragel column working at a temperature of 40° C. and at a pressure equal to 645 psi and equipped with an RI (refractive index) detector.
  The THF flow rate is equal to 1 mL/min.
  In a typical analysis, 100 μL of sample at 0.5% m/m filtered beforehand through a 0.45 μm Millipore filter are injected into the column.
  The number-average molar masses ($M_n$) are determined from calibration curves constructed using PMMA (poly (methyl methacrylate)) standards.

C—Copolymerization—Production of an EHA/DMAEA Block Copolymer

Step 1—Synthesis of Block A (EHA):
  30.0 g (163.0 mmol) of 2-ethylhexyl acrylate (EHA), 0.94 g (2.72 mmol) of 2-cyano-2-propyl dodecyl trithiocarbonate (CPDTTC) and 35 mL of toluene are introduced into a 250 mL round-bottomed flask. 44.3 mg (0.27 mmol) of AIBN are weighed out in a 20 mL round-bottomed flask and then dissolved in 4 mL of toluene. The two solutions are degassed with nitrogen for 30 minutes. The solution containing the EHA monomer is heated to 70° C. When the temperature is reached, the AIBN solution is added to the EHA/CPDTTC mixture using a syringe purged beforehand with nitrogen. The reaction medium is stirred for 24 hours at 70° C. under an inert atmosphere ($N_2$).
  250 μL of the reaction mixture are collected at $t_0$ (just after the addition of the AIBN) and at $t_f$ (after 24 hours of stirring) and are analyzed by HPLC in order to measure the content of residual EHA monomers present in the medium, before and after reaction. The ratio of the areas of the peaks relating to the EHA monomer makes it possible to determine the degree of conversion of the EHA monomers. In the present case, the degree of conversion of the EHA monomers is equal to 98%.

Step 2—Synthesis of Block B (DMAEA):
  3.89 g (27.0 mmol) of 2-(dimethylamino)ethyl acrylate (DMAEA) are weighed out in a 50 mL round-bottomed flask. 11 mL of toluene are added. Separately, 44.3 mg (0.27 mmol) of AIBN are weighed out in a 20 mL round-bottomed flask and then dissolved in 3 mL of toluene. The two solutions are degassed with nitrogen for 30 minutes. The DMAEA solution is then added, using a syringe purged beforehand with nitrogen, to the mixture obtained at the end of step 1 and maintained at 70° C. The AIBN solution is finally added to the reaction medium also using a syringe purged beforehand with nitrogen. The reaction medium is stirred for 24 hours at 70° C. under an inert atmosphere ($N_2$).
  250 μL of the reaction mixture are collected at $t_0$ (just after the addition of the AIBN) and at $t_f$ (after 24 hours of stirring) and are analyzed by HPLC in order to measure the content of residual DMAEA monomers present in the medium, before and after reaction. The ratio of the areas of the peaks relating to the DMAEA monomer makes it possible to determine a degree of conversion of the DMAEA monomers equal to 97%.

The contents of residual EHA and DMAEA monomers are determined by $^1$H NMR spectroscopy and the relative composition of the copolymer (EHA/DMAEA mole ratio) and the number of EHA and DMAEA units are determined by $^{13}$C NMR.

For the determination of the contents of residual monomers, the following are detected:

for the residual DMAEA monomers, a main series of signals obtained for chemical shift values equal to 6.43 ppm, 6.15 ppm and 5.82 ppm (AMX system). Assignment of these signals to the DMAEA monomers is confirmed by the observation of two triplets of comparable intensity obtained for chemical shift values equal to 4.3 ppm and 2.7 ppm and associated with the —OCH$_2$ and —NCH$_2$ groups of the residual DMAEA monomer, for the residual EHA monomers, three ethylenic signals of low intensity obtained for chemical shift values equal to 6.39 ppm, 6.13 ppm and 5.80 ppm.

By using the integral of the singlet associated with TCNB (7.7 ppm) as unit reference, and taking into account the molar masses of the compounds involved (184, 143 and 261 g·mol$^{-1}$ for EHA, DMAEA and TCNB), the content of residual EHA is 0.1% by mass and the content of residual DMAEA is 0.5% by mass.

For the determination of the relative composition (EHA/DMAEA mole ratio), the signal obtained at about 22.8 ppm, assigned to the CH$_3$CH$_2$ group of the RAFT end group, is used. By setting its integral at 1, an integral of 0.95 is obtained for the broad signal obtained at 180.6 ppm and associated with the —COOH group of the RAFT agent. An integral of 3.35 is also measured for the $^{13}$C NMR signal of the —C=H group of TCNB. With this same reference, mean integrals are obtained (corrected to take into account of the presence of residual monomers) equal to 62 for EHA and 10 for DMAEA corresponding to the number of units (86/14 EHA/DMAEA mole ratio).

Finally, the number-average molar masses $M_n$ and mass-average molar masses $M_w$, and also the dispersity index, which reflects the size dispersity Đ (Đ=$M_w/M_n$), are determined by GPC:

$M_n$=13 800 g/mol; $M_w$=15 900 g/mol; Đ=1.15.

D—Quaternization—Production of an EHA/q-DMAEA Block Copolymer

The following are successively added to the reaction medium obtained at the end of step 2 above:

46 mL of n-butanol,
7.79 g (108 mmol) of 1,2-epoxybutane, and
6.48 g (108 mmol) of acetic acid.

The medium is stirred for 24 hours at 60° C. After returning to room temperature, the solvent is evaporated to dryness.

The EHA/q-DMAEA block copolymer is obtained.

The degree of quaternization of the copolymer obtained is determined by $^{13}$C NMR. The unresolved peak obtained at about 70 ppm is assigned to the CH$_2$ of the —CH$_2$CHOHCH$_2$CH$_3$ group located alpha to the quaternized nitrogen atom. On the basis of the EHA/DMAEA molar proportion (86/14) determined above, and by comparing the integral of this unresolved peak to the integral of the characteristic signals of the carbons associated with the EHA units, a degree of quaternization equal to 95% is determined.

2. Preparation of Various Fuel Compositions

A—Materials

Additive A: the additive A is a monoamine substituted with a polyisobutylene group of molecular mass Mn=1000 g/mol and the polydispersity index (Mw/Mn) of which is equal to 1.6. This compound is commercially available from the company BASF under the commercial reference Kerocom® PIBA-03.

Carrier oil CO: the carrier oil CO a polyether polymer which consists predominantly of aliphatic hydrocarbon-based compounds and of polypropylene oxide. This carrier oil is commercially available from the company Chevron Oronite under the commercial reference OLOA 2509H.

The fuel:

The fuel C1 is a gasoline fuel of RON 98 super unleaded fuel type containing 15% v/v of ETBE (ethyl tert-butyl ether) and corresponding to the standard EN228.

The fuel C1 is commercially available from the company Total under the commercial reference Supercarburant SP98 E5.

The fuel C1 is a fuel conventionally used in European countries in which the climatic conditions favor the appearance of deposits at low temperature, liable to cause valve sticking. It thus constitutes a reference fuel for "valve sticking" tests.

The fuel C2 is a gasoline fuel of CEC RF12-09 type commercially available from the company Halterman.

The fuel C2 is a fuel known to those skilled in the art for leading to the formation of deposits at high temperature. It thus constitutes a reference fuel for detergency tests performed in the context of deposits at high temperature.

B—Compositions

The fuel compositions C11 to C14, defined in table 1 below, are prepared by additive enhancement of the virgin gasoline fuel C1.

The fuel compositions C21 to C24, defined in table 1 below, are prepared by additive enhancement of the virgin gasoline fuel C2.

In table 1 below, the contents are given in ppm by mass relative to the total mass of the fuel compositions obtained.

TABLE 1

| Compositions | Additive A | Copolymer[1] | Carrier oil CO |
|---|---|---|---|
| Compositions prepared from the virgin oil C1 | | | |
| C11 (comparative) | 300 | — | 180 |
| C12 (comparative) | — | 300 | 180 |
| C13 (according to the invention) | 270 | 30 | 180 |
| C14 (according to the invention) | 240 | 60 | 180 |
| Compositions prepared from the virgin oil C2 | | | |
| C21 (comparative) | 300 | — | 180 |
| C22 (comparative) | — | 300 | 180 |
| C23 (according to the invention) | 270 | 30 | 180 |
| C24 (according to the invention) | 240 | 60 | 180 |

[1]EHA/q-DMAEA block copolymer synthesized above

3. Evaluation of the Capacity of the Fuel Compositions to Cause Valve Sticking.

The capacity of the fuel compositions C1 and C11 to C14 to cause valve sticking of an indirect-injection engine is evaluated according to the standard CEC F16-96 (at +5° C.). The measurement is repeated three times.

The results obtained for the valve sticking test are summarized in table 2 below. The value "1" indicates that no valve sticking was observed in the course of the three tests performed.

The value "0" indicates that valve sticking was observed in the course of at least one test.

TABLE 2

| Composition | C1 | C11 | C12 | C13 | C14 |
|---|---|---|---|---|---|
| CEC F16*96 | 1 | 0 | 1 | 1 | 1 |

No valve sticking is observed with the virgin fuel (composition C1).

No valve sticking is observed in the course of the tests performed with the fuel composition additive-enhanced with the copolymer obtained previously and the carrier oil CO (composition C12).

Conversely, running of the engine with the fuel composition additive-enhanced with the additive A and the carrier oil CO results in valve sticking of the engine (composition C11).

No valve sticking is observed in the course of the tests performed using the fuel composition additive-enhanced with the copolymer synthesized above, the additive A and also the carrier oil CO (compositions C13 and C14 according to the invention). The addition of the copolymer obtained previously to a fuel composition comprising both the additive A and the carrier oil CO thus makes it possible to prevent the valve sticking which takes place during the running of the engine with a fuel composition additive-enhanced only with the additive A and the carrier oil CO.

4. Evaluation of the Detergent Properties of the Fuel Compositions

The detergency properties of the fuel compositions C2 and C21 to C24 are evaluated according to the standard CEC F05-93.

The detergency test results are given in table 3 below.

TABLE 3

| Composition | Mass of deposits per valve (in mg) |
|---|---|
| C2 (comparative) | 328 |
| C21 (comparative) | 4 |
| C22 (comparative) | 683 |
| C23 (according to the invention) | 8 |
| C24 (according to the invention) | 17 |

Running of the engine using the virgin fuel composition C2 leads to the formation of 328 mg of deposits on the surface of the engine valves.

Additive enhancement of the fuel with the additive A and the carrier oil CO makes it possible to significantly reduce the amount of deposits (composition C21: 4 mg of deposits per valve) The mass of deposits formed on the injectors is divided by more than 80.

Conversely, additive enhancement of the fuel with the copolymer prepared above and the carrier oil CO leads to a significant increase in the mass of deposits formed on the valves (composition C22: 683 mg of deposits per valve): the amount of deposits has more than doubled.

The combination of the copolymer and of the carrier oil CO thus does not have any detergent activity.

However, the combined introduction of the additive A, of the copolymer obtained previously and of the carrier oil CO into the fuel makes it possible to significantly reduce the mass of deposits formed on the valves (compositions C23 and C24: 8 and 17 mg respectively). The amount of deposits formed during the use of the fuel compositions C23 and C24 is reduced more than 20-fold relative to the fuel that is not additive-enhanced C2, in particular more than 40-fold for composition C23.

The invention claimed is:

1. A fuel additive composition comprising:
   (a) one or more copolymers comprising:
   at least one unit of formula (I) below:

$$\left(\begin{array}{c} R_1' \\ | \\ -\!\!\!-\!\!\!-\!\!\!- \\ | \\ (E)_u \\ | \\ G \end{array}\right) \quad (I)$$

with
u=0 or 1,
$R_1'$ is chosen from the group consisting of a hydrogen atom and a methyl group,
E is chosen from the group consisting of —O—, —N(Z)—, —O—CO—, —CO—O—, —NH—CO— and —CO—NH—, with Z representing H or a $C_1$-$C_6$ alkyl group,
G represents a group chosen from the group consisting of a $C_1$-$C_{34}$ alkyl, an aromatic nucleus, an aralkyl comprising at least one aromatic nucleus and at least one $C_1$-$C_{34}$ alkyl group, and
at least one unit of formula (II) below:

$$\left(\begin{array}{c} R_1'' \\ | \\ -\!\!\!-\!\!\!-\!\!\!- \\ | \\ C \!\!=\!\! O \\ | \\ Q \\ | \\ R \end{array}\right) \quad (II)$$

in which
$R_1''$ is chosen from the group consisting of a hydrogen atom and a methyl group,
Q is chosen from the group consisting of an oxygen atom and a group —NR'— with R' being chosen from the group consisting of a hydrogen atom and $C_1$ to $C_{12}$ hydrocarbon-based chains,
R comprises a $C_1$ to $C_{34}$ hydrocarbon-based chain substituted with at least one quaternary ammonium group and optionally one or more hydroxyl groups, the group R also possibly containing one or more nitrogen and/or oxygen atoms and/or carbonyl groups,
wherein the units of formula (I) and the units of formula (II) represent at least 70 mol % of the copolymer (a), relative to the number of moles of units included in the composition of the copolymer (a),
   (b) one or more amines substituted with a polyalkenyl group, and
   (c) at least one carrier oil.

2. The fuel additive composition as claimed in claim 1, wherein in formula (II), the quaternary ammonium group is chosen from the group consisting of pyrrolinium, pyridinium, imidazolium, triazolium, triazinium, oxazolium and isoxazolium quaternary ammoniums.

3. The fuel additive composition as claimed in claim 1, wherein in formula (II), the quaternary ammonium group is chosen from the group consisting of trialkylammonium, iminium, amidinium, formamidinium, guanidinium and biguanidinium quaternary ammoniums.

4. The fuel additive composition as claimed in claim 1, wherein in formula (II), the group R is represented by one of the formulae (III) and (IV) below:

$$\begin{array}{c}\text{R3}\\ \text{R4}-\text{N}_+-\text{R2}-\\ \text{R5} \quad \text{X}^-\end{array} \quad \text{(III)}$$

$$\begin{array}{c}\text{R6} \quad \text{R2}\\ \text{N}_+\\ \text{R7} \quad \text{X}^-\end{array} \quad \text{(IV)}$$

in which:

$X^-$ is chosen from hydroxide and halide ions and organic anions, $R_2$ is chosen from $C_1$ to $C_{34}$ hydrocarbon-based chains, optionally substituted with at least one hydroxyl group, $R_3$, $R_4$ and $R_5$ are identical or different and chosen independently from $C_1$ to $C_{18}$ hydrocarbon-based chains, the alkyl groups $R_3$, $R_4$ and $R_5$ may contain one or more groups chosen from the group consisting of a nitrogen atom, an oxygen atom and a carbonyl group and that the groups $R_3$, $R_4$ and $R_5$ may be connected together in pairs to form one or more rings, $R_6$ and $R_7$ are identical or different and chosen independently from $C_1$ to $C_{18}$ hydrocarbon-based chains, it being understood that the groups $R_6$ and $R_7$ may contain one or more groups chosen from the group consisting of a nitrogen atom, an oxygen atom and a carbonyl group and that the groups $R_6$ and $R_7$ may be connected together to form a ring.

5. The fuel additive composition as claimed in claim 1, in which the copolymer is obtained by copolymerization of at least:

one monomer ($m_a$) corresponding to formula (VII) below:

$$\begin{array}{c}\text{H}_2\text{C}=\text{R1}'\\ |\\ (\text{E})_u\\ |\\ \text{G}\end{array} \quad \text{(VII)}$$

in which $R_1'$, u, E and G are as defined in claim 1, and one monomer ($m_b$) corresponding to formula (VIII) below:

$$\begin{array}{c}\text{H}_2\text{C}=\text{R1}''\\ |\\ \text{C}=\text{O}\\ |\\ \text{Q}\\ |\\ \text{R}\end{array} \quad \text{(VIII)}$$

in which $R_1''$, Q and R are as defined in claim 1.

6. The fuel additive composition as claimed in claim 1, in which the copolymer (a) is a block copolymer comprising:

a block A corresponding to formula (XI) below:

$$\left(\begin{array}{c}\text{R1}'\\ |\\ \\ |\\ (\text{E})_u\\ |\\ \text{G}\end{array}\right)_p \quad \text{(XI)}$$

in which p is an integer ranging from 2 to 100, $R_1'$, u, E and G are as defined in claim 1, and a block B corresponding to formula (XII) below:

$$\left(\begin{array}{c}\text{R1}''\\ |\\ \\ |\\ \text{C}=\text{O}\\ |\\ \text{Q}\\ |\\ \text{R}\end{array}\right)_n \quad \text{(XII)}$$

in which n is an integer ranging from 2 to 50, $R_1''$, Q and R are as defined in claim 1.

7. The fuel additive composition as claimed in claim 6, in which:

block A consists of a chain of structural units derived from a $C_1$-$C_{34}$ alkyl (meth)acrylate monomer ($m_a$), and block B consists of a chain of structural units derived from an alkyl (meth)acrylate or (meth)acrylamide monomer ($m_b$), the alkyl radical of which consists of a $C_1$ to $C_{34}$ hydrocarbon-based chain substituted with at least one quaternary ammonium group and optionally one or more hydroxyl groups.

8. The fuel additive composition as claimed in claim 6, wherein the number of equivalents of monomer ($m_a$) of block A is from 2 to 100 mol.

9. The fuel additive composition as claimed in claim 6, wherein the number of equivalents of monomer ($m_b$) of block B is from 2 to 50 mol.

10. The fuel additive composition as claimed in claim 6, wherein the copolymer (a) comprises at least one sequence of blocks AB, ABA or BAB in which said blocks A and B form a sequence without the presence of an intermediate block of different chemical nature.

11. The fuel additive composition as claimed in claim 1, in which the amine(s) substituted with a polyalkenyl group (b) are chosen from polyisobutene amines.

12. The fuel additive composition as claimed in claim 1, in which the mass ratio between the copolymer(s) (a) and the amine(s) substituted with a polyalkenyl group (b) ranges from 5:95 to 95:5.

13. The fuel additive composition as claimed in claim 1, in which the ratio between the mass of carrier oil (c) and the sum of the masses of copolymers (a) and of amines substituted with a polyalkenyl group (b) ranges from 0.1 to 2.

14. The fuel additive composition as claimed in claim 1 wherein it comprises from 5 to 99% by weight of copolymer(s) a) and from 5 to 99% by mass of amines substituted with a polyalkenyl group b).

15. A fuel composition comprising:
(1) a fuel derived from one or more sources chosen from the group consisting of mineral, animal, plant and synthetic sources, and
(2) a fuel additive composition as claimed in claim 1.

16. A method to clean or keep clean at least one of the internal parts of a spark ignition engine or a gasoline compression ignition engine, or to reduce the fuel consumption of said spark ignition engine or of said gasoline compression ignition engine, or to reduce the pollutant emissions of said spark ignition engine or of said gasoline compression ignition engine, wherein the method comprises supplementing a liquid fuel for spark ignition engines or gasoline compression ignition engines with a fuel additive composition as claimed in claim 1.

17. The method as claimed in claim 16, to clean or keep clean at least one of the internal parts of a direct-injection spark ignition engine or a gasoline compression ignition engine, wherein the internal parts are the engine injectors.

18. The method as claimed in claim 16, to clean or keep clean at least one of the internal parts of an indirect-injection spark ignition engine or a gasoline compression ignition engine, wherein the internal parts are the engine intake valves.

19. The method as claimed in claim 18, to prevent intake valve sticking in an indirect-injection spark ignition engine or gasoline compression ignition engine.

\* \* \* \* \*